(12) United States Patent
Rowe et al.

(10) Patent No.: US 11,522,701 B2
(45) Date of Patent: ***Dec. 6, 2022

(54) GENERATING AND MANAGING A COMPOSITE IDENTITY TOKEN FOR MULTI-SERVICE USE

(71) Applicant: Citrix Systems, Inc., Fort Lauderdale, FL (US)

(72) Inventors: Bradley Markus Rowe, Boca Raton, FL (US); Ricardo Feijoo, Davie, FL (US); Tom Michael Kludy, Cooper City, FL (US); Ayush Jain, Franklin Park, NJ (US); Gerald Haagsma, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/684,780

(22) Filed: Nov. 15, 2019

(65) Prior Publication Data

US 2020/0084036 A1    Mar. 12, 2020

Related U.S. Application Data

(63) Continuation of application No. 15/714,460, filed on Sep. 25, 2017, now Pat. No. 10,505,733.

(51) Int. Cl.
*H04L 9/32* (2006.01)
*H04L 9/08* (2006.01)
*H04L 9/40* (2022.01)

(52) U.S. Cl.
CPC .......... *H04L 9/3213* (2013.01); *H04L 9/0891* (2013.01); *H04L 63/0807* (2013.01);
(Continued)

(58) Field of Classification Search
CPC . H04L 9/3213; H04L 9/0891; H04L 63/0807; H04L 63/0884; H04L 9/0861; H04L 2463/082; H04L 9/32
See application file for complete search history.

(56) References Cited

U.S. PATENT DOCUMENTS 5,852,747 A    12/1998 Bennett et al.
7,240,192 B1    7/2007 Paya et al.
(Continued)

FOREIGN PATENT DOCUMENTS

EP         2323308 B1 *  5/2011  .......... H04L 9/3231
WO   WO-2013025592 A1 *  2/2013  ............ G06F 21/00

*Primary Examiner* — Theodore C Parsons
*Assistant Examiner* — Howard H. Louie
(74) *Attorney, Agent, or Firm* — Banner & Witcoff, Ltd.

(57) ABSTRACT

Methods, systems, computer-readable media, and apparatuses may provide creation and management of composite tokens for use with services in a virtual environment without the user having to re-authenticate each time the user accesses a different service. A composite identity server may receive a request to upgrade a first authentication token for a user. The composite identity server may redirect a user agent to an identity provider for authentication and, in response, may receive a second authentication token for the user. The composite identity server may send the second authentication token to a federated microservice and, in response, may receive one or more claims of the second authentication token designated for inclusion in a composite token. The composite identity server may generate a composite token including the one or more claims of the first authentication token and one or more claims of the second authentication token.

20 Claims, 11 Drawing Sheets

(52) U.S. Cl.
CPC ........ *H04L 63/0884* (2013.01); *H04L 9/0861* (2013.01); *H04L 2463/082* (2013.01)

(56) References Cited

U.S. PATENT DOCUMENTS

| | | |
|---|---|---|
| 9,407,628 B2 | 8/2016 | Sondhi et al. |
| 10,158,646 B1 | 12/2018 | Desai et al. |
| 2002/0147929 A1 | 10/2002 | Rose |
| 2003/0149781 A1 | 8/2003 | Yared et al. |
| 2004/0010603 A1 | 1/2004 | Foster et al. |
| 2004/0187009 A1 | 9/2004 | Ebata |
| 2005/0074126 A1 | 4/2005 | Stanko |
| 2006/0218625 A1 | 9/2006 | Pearson et al. |
| 2006/0259776 A1* | 11/2006 | Johnson ................ G06F 21/604 713/185 |
| 2008/0307517 A1 | 12/2008 | Grigoriev et al. |
| 2009/0235347 A1 | 9/2009 | Syed et al. |
| 2010/0122333 A1 | 5/2010 | Noe |
| 2011/0030047 A1* | 2/2011 | Gao ..................... H04W 12/068 726/9 |
| 2012/0167194 A1 | 6/2012 | Reese et al. |
| 2013/0054968 A1* | 2/2013 | Gupta ..................... H04L 63/08 713/168 |
| 2013/0086645 A1 | 4/2013 | Srinivasan et al. |
| 2014/0090037 A1 | 3/2014 | Singh |
| 2014/0282940 A1 | 9/2014 | Williams et al. |
| 2015/0089569 A1 | 3/2015 | Sondhi et al. |
| 2015/0195268 A1 | 7/2015 | Fang |
| 2016/0066004 A1 | 3/2016 | Lieu et al. |
| 2016/0134599 A1 | 5/2016 | Ross et al. |
| 2016/0283740 A1 | 9/2016 | Roundtree |
| 2017/0076366 A1* | 3/2017 | Wadley ................. G06Q 50/18 |
| 2017/0171200 A1 | 6/2017 | Bao et al. |
| 2018/0218121 A1 | 8/2018 | Gassner et al. |
| 2019/0058706 A1 | 2/2019 | Feijoo et al. |
| 2019/0073842 A1* | 3/2019 | Lee ......................... G07C 9/22 |
| 2019/0097802 A1 | 3/2019 | Rowe et al. |

\* cited by examiner

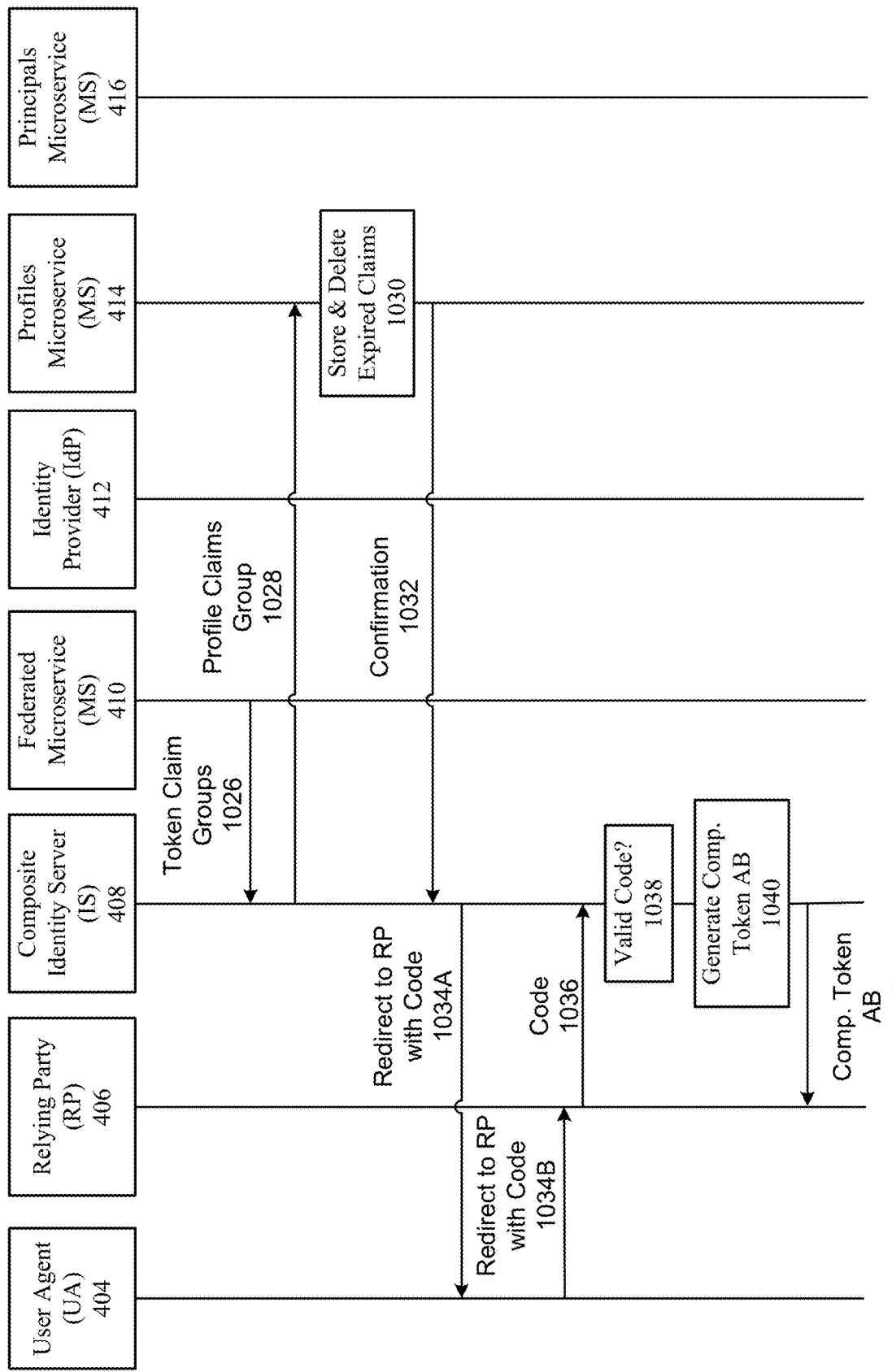

GENERATING AND MANAGING A COMPOSITE IDENTITY TOKEN FOR MULTI-SERVICE USE

CROSS-REFERENCE TO RELATED APPLICATIONS

This application is a continuation of and claims priority to U.S. application Ser. No. 15/714,460, filed Sep. 25, 2017, now allowed, entitled "Generating and Managing a Composite Identity Token For Multi-Service Use," the contents of which are incorporated by reference in its entirety in this disclosure.

FIELD

Aspects of the disclosure relate to computer hardware and software. In particular, one or more aspects of the disclosure generally relate to computer hardware and software for generation and management of a composite token to interact with multiple services provided by different relying parties in a virtualized environment.

BACKGROUND

A virtual environment service provider may provide a virtual, cloud-based environment for a user to access various services via a user agent (e.g., a web browser, software application, mobile app, etc.). The virtual environment service provider may also provide identity management. For instance, in the virtual, cloud-based environment, the virtual environment service provider may issue a user of the user agent a security token service (STS) identity for use in interacting with its various services. The STS identity is commonly referred to as an "authentication token" or simply a "token." This token may be used to establish identity to various service providers to establish the individual's access right, "authorization," to the service. As virtual environment service providers push to expand their services, they may also attempt to add support, in the virtual, cloud-based environment, for services provided by other entities. Because the user's STS identity is specific to the virtual environment service provider, the STS identity might not be sufficient to permit use of or access to services provided by these other entities. As a result, virtual environment service providers might not be able to provide users access to services from different entities.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure provide technology that enhances the user experience by providing access to resources and services of different entities (e.g., relying parties) when a user establishes the user's identity via different "identity providers" in a centralized, virtual, cloud-based environment. Because different identity providers issue users tokens that are unique to the identity provider, a user of the virtual environment might have to repeatedly complete the authorization procedures of each relying party before accessing its services, even within the same user session. For example, a user may successfully authenticate and obtain access to services of a first relying party and, subsequently, may obtain access to services of a second relying party that uses a different identity provider. When the user returns to use the services of the first relying party, the user would have to repeat the authentication process for the first relying party using a different identity provider since each identity (e.g., token) that is issued in response to the authenticating the user is specific to one identity provider. As a result, aspects of the disclosure provide technology that, in the centralized virtual environment, permit a user to use services secured by different relying parties and identity providers and associated with different issued tokens while maintaining a single sign-on experience.

Aspects of the disclosure address issues described above by disclosing methods, computer-readable media, software systems, and apparatuses for generating and updating a composite token for use with multiple services provided by different relying parties in a virtual, cloud-based environment. Each of the relying parties may be associated with a corresponding identity provider. The composite token may include, for each identity provider, one or more claims from a token issued by the corresponding identity provider and/or one or more augmented claims from the token issued by the corresponding identity provider. As a result, the user may interact with the various services using the composite token without having to re-authenticate each time the user accesses a service provided by a different relying party. Additional aspects disclose methods, computer-readable media, software systems, and apparatuses for on-demand retrieval of an identity provider's token in instances where the composite token might be insufficient to access a service. Yet additional aspects disclose methods, computer-readable media, software systems, and apparatuses for enabling a composite token to be used in connection with two-factor authentication schemes to access highly secured services.

In some embodiments, a composite identity server, including at least one processor, at least one memory, and at least one communication interface, may perform a method. Specifically, the composite identity server may receive, from a user agent associated with a user computing device, a request to upgrade a first authentication token triggered by a relying party server. The relying party server may be associated with services provided by a first relying party and services provided by a second relying party. The first authentication token may have been issued by a first identity provider to permit the user agent access to the services provided by the first relying party. In response to receiving the request to upgrade the first authentication token, the composite identity server may determine whether the user agent is currently involved in a valid identity login session associated with the relying party server.

In response to determining that the user agent is currently involved in the valid identity login session associated with the relying party server, the following method may be performed. The composite identity server may redirect the user agent to an identity provider server associated with a second identity provider so that the second identity provider server may authenticate the user associated with the user agent. In response to determining that the user is an authentic user, the identity provider server may provide the user agent with an authorization code associated with the identity provider server and redirect the user agent back to the composite identity server. After the composite identity server has redirected the user agent to the first identity provider server, the composite identity server may receive, from the user agent, the authorization code associated with the identity provider server, which the composite identity server may, in turn, send to the identity provider server for validation. If the identity provider server determines that the authorization code associated with the identity provider server is valid (e.g., matches the authorization code it sent to the user agent), the composite identity server may receive, from identity provider server, a second authentication for the user. The second authentication token may indicate that the authorization code associated with the first identity provider server is valid. The second authentication token may permit the user agent access to the services provided by the second relying party.

The composite identity server may send, to a federated microservice server, the second authentication token for the user for transformation. The federated microservice server may be specific to the second identity provider. After sending the second authentication token for transformation, the composite identity server may receive, from the federated microservice server, one or more transformed claims of the second authentication token and one or more claims of the second authentication token designated for storage by a profile microservice server. The composite identity server may send, to the profile microservice server, the one or more claims of the second authentication token designated for storage at the profile microservice server.

After receiving a storage confirmation from the profile microservice server, the composite identity server may redirect the user agent to the relying party server with an authorization code associated with the composite identity server. After redirecting the user agent to the relying party server, the composite identity server may receive, from the relying party server, the authorization code associated with the composite identity server, which the identity provider may, in turn, verify that the received authorization code matches the authorization code provided to the user agent. If so, the composite identity server may generate a composite token for the user and send the composite token to the relying party server. The composite token may include one or more transformed claims of the second authentication token and one or more claims of the first authentication token. The composite identity token may permit, via the relying party server, the user agent access to the services provided by the first relying party and the services provided by the second relying party.

These features, along with many others, are discussed in greater detail below.

BRIEF DESCRIPTION OF THE DRAWINGS

The present disclosure is illustrated by way of example and not limited in the accompanying drawings in which like reference numerals indicate similar elements and in which:

FIGS. 10A-10C depicts an illustrative message flow diagram for creating a composite token in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
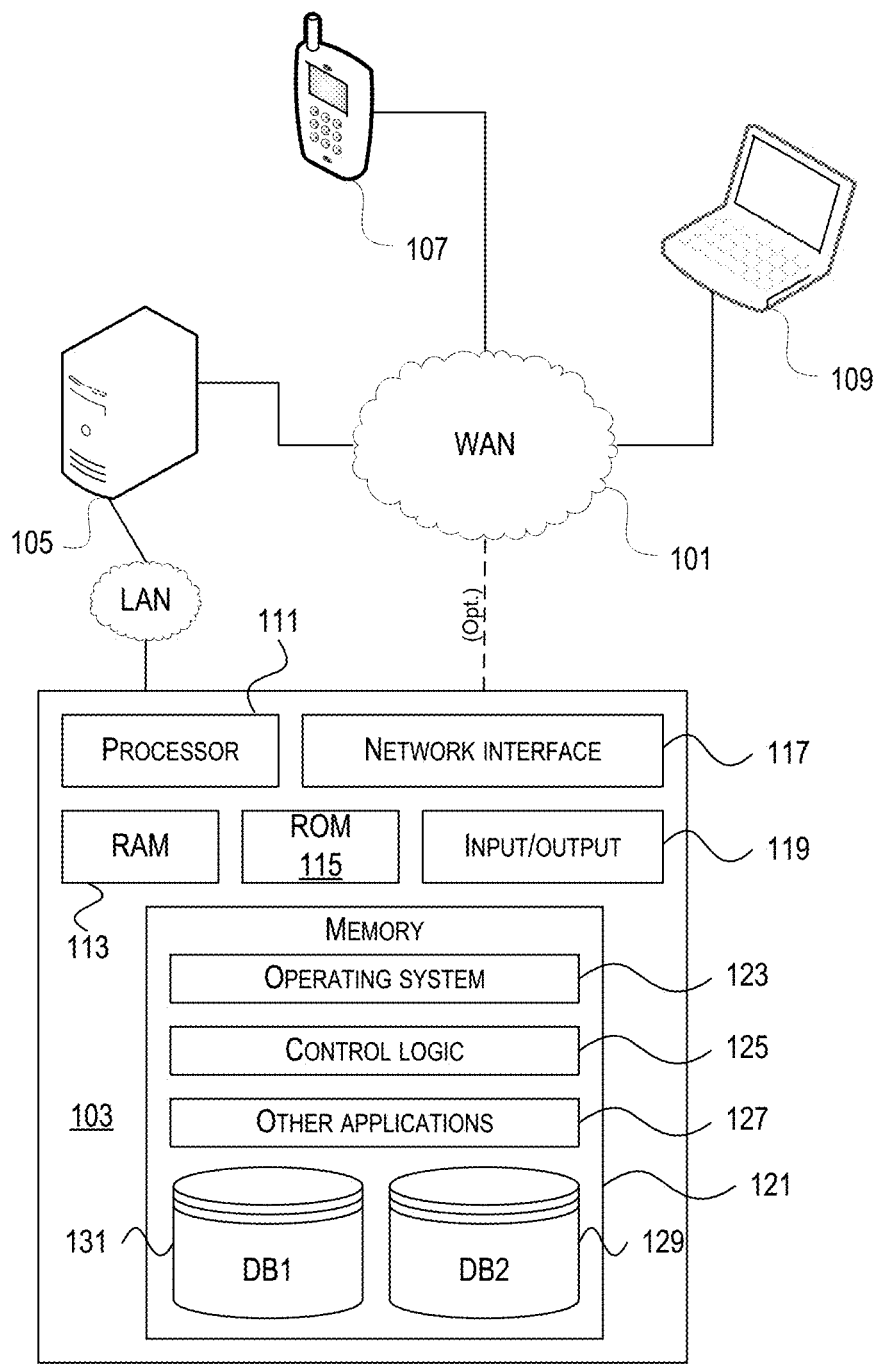
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown)

may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109 (also referred to herein as "user device(s)"). Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 131 and a second database 129. In some embodiments, the first database may include the second database (e.g., as a separate table, report, etc.). That is, the information may be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer-executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
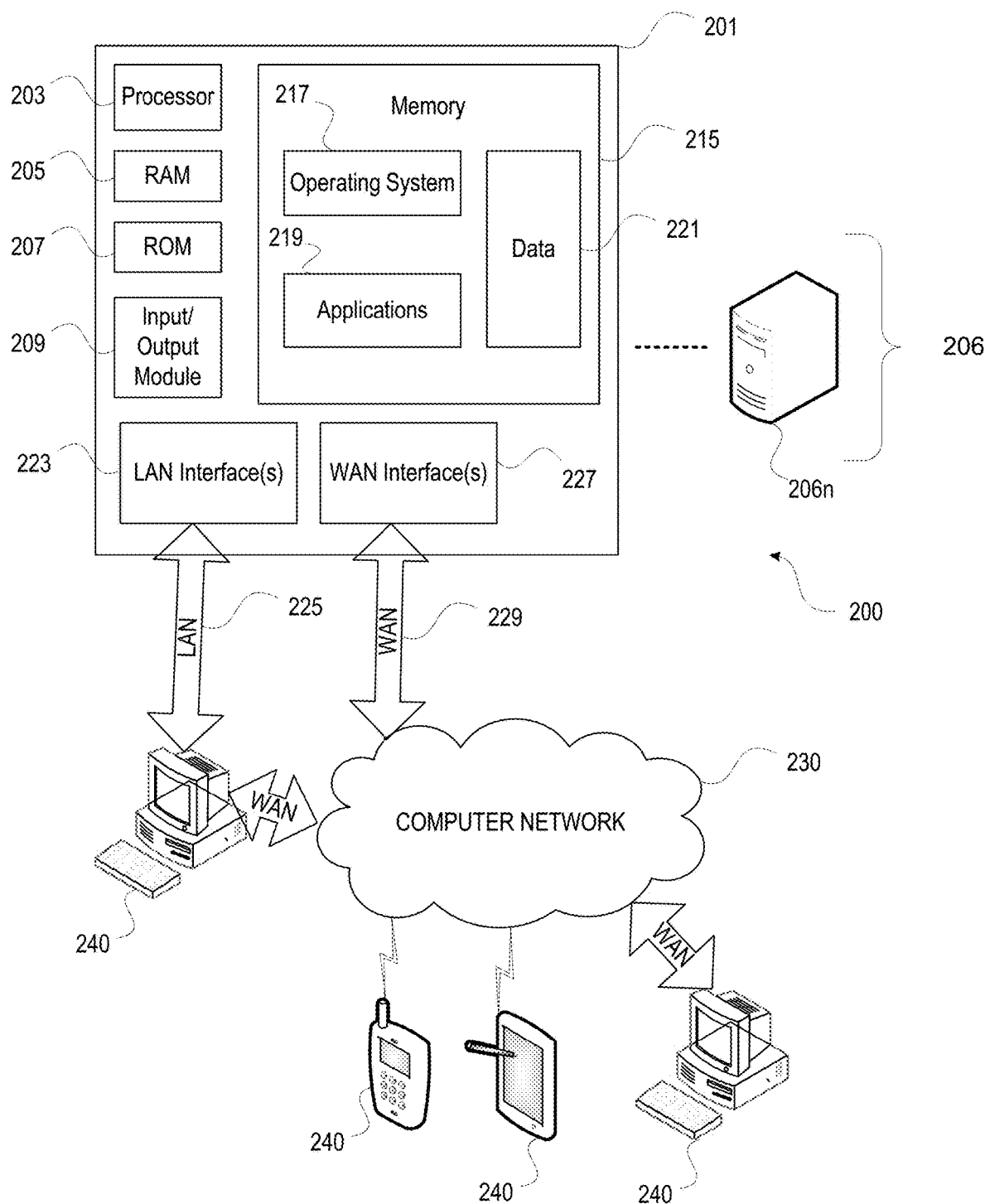
FIG. 2 depicts an illustrative remote-access system architecture that may be used in accordance with one or more illustrative aspects described herein.

With reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases may load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment, a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: user device(s), client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications may be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol may be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions may be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 may include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a may then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications may be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
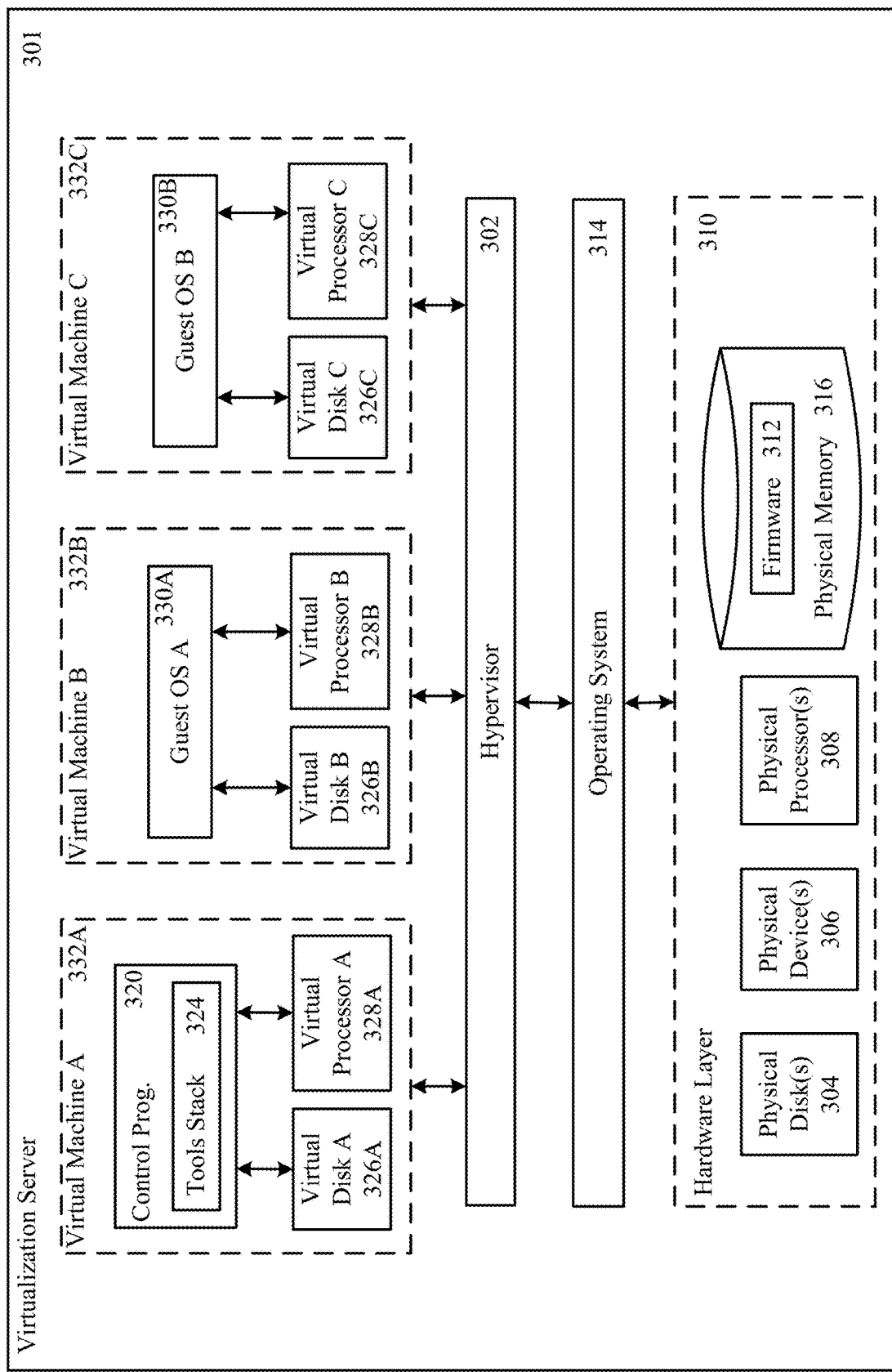
FIG. 3 depicts an illustrative virtualized (hypervisor) system architecture that may be used in accordance with one or more illustrative aspects described herein.

With reference to FIG. 3, a computer device 301 may be configured as a virtualization server in a virtualization environment, for example, a single-server, multi-server, or cloud computing environment. Virtualization server 301 illustrated in FIG. 3 may be deployed as and/or implemented by one or more embodiments of the server 206 illustrated in FIG. 2 or by other known computing devices. Included in virtualization server 301 is a hardware layer 310 that may include one or more physical disks 304, one or more physical devices 306, one or more physical processors 308 and one or more physical memories 316. In some embodiments, firmware 312 may be stored within a memory element in the physical memory 316 and may be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and may be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, session 0 or other virtual machine used for system administration and/or control. In some embodiments, one or more virtual machines 332B-C may execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 may include one or more physical disks 304, one or more physical devices 306, one or more physical processors 308, and one or more memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 may be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, may provide virtual resources to operating systems 330 or control programs 320 executing on virtual machines 332 in any manner that simulates the operating systems 330 or control programs 320 having direct access to system resources. System resources may include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 may execute programs and processes much like a physical computing device. While FIG. 3 illustrates an embodiment where a virtualization server 301 hosts three virtual machines 332, in other embodiments virtualization server 301 may host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 may be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 may be unique when compared with the other virtual disks 326.

A virtual processor 328 may be a virtualized view of one or more physical processors 308 of the virtualization server 301. In some embodiments, the virtualized view of the physical processors 308 may be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Composite Token Creation and Management Mechanisms

Figure 4:
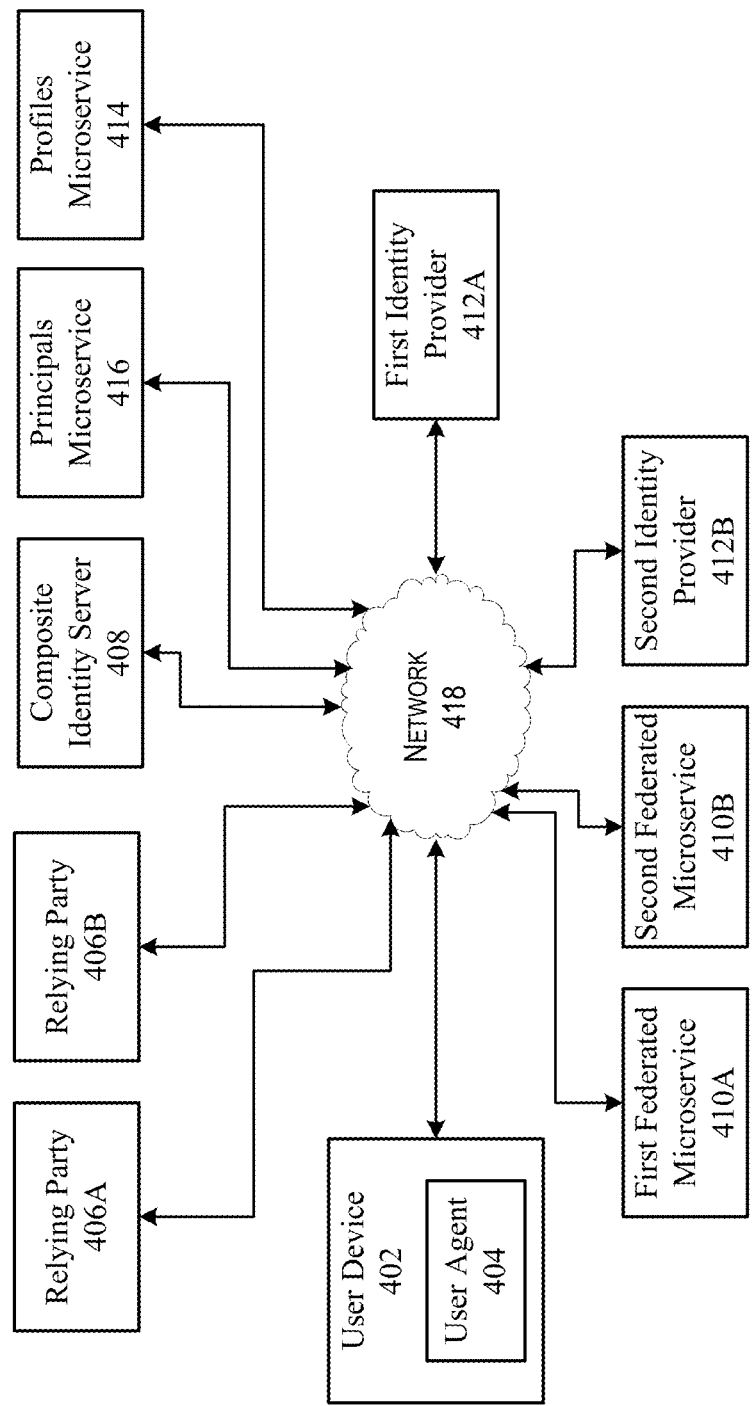
FIG. 4 depicts an illustrative system in accordance with one or more illustrative aspects described herein.

FIG. 4 depicts an illustrative system in accordance with one or more illustrative aspects described herein. Each of the components depicted in FIG. 4 (e.g., user device 402, relying parties 406, composite identity server 408, federated microservices 410, identity providers 412, profiles microservice 414, and principals microservice 416) may be or include one or more servers, computers, or other computing devices and include the components and functionality of computing device 201 depicted in FIG. 2. Components of system 400 may communicate with one another via one or more computer networks 418 (e.g., LAN 101/225, WAN 229, computer network 230, etc.).

As shown in FIG. 4, a system 400 may include a user device 402 through which a user may access system resources. User device 402 may be any type of computing device including, for example, a server, computer, laptop, tablet, smartphone, or other client device that includes a processor (e.g., computing device 201). User device 402 may communicate, via its communication interfaces (e.g., wireless interfaces, LAN interfaces, WLAN interfaces), with other devices/entities such as relying parties 406, composite identity server 408, and identity providers 412 as will be discussed in detail below. User device 402 may also communicate with various network nodes described herein.

User device 402 may include a user agent 404 which may be responsible for presenting portals to the user through which the user may interact with and/or otherwise access various services, resources, and components of FIG. 4 (e.g., relying parties 406, composite identity server 408, etc.). As an example, user agent 404 may be a web browser installed on user device 402. As another example, user agent 404 may be a dedicated mobile application and/or other software program that facilitates communication with other devices, entities, and nodes of system 400. In some instances, user agent 404 may be managed by a party other than the user such as an administrator of the user's employer in a bring-your-own-device environment.

System 400 may include multiple relying parties 406, which may be associated with one or more relying party servers responsible for providing and managing a virtual, cloud-based environment the user wishes to access via the user agent 404. As an example, a first relying party 406A may, via the relying party servers, provide and manage the virtual, cloud-based environment. The first relying party 406A may also provide, via the relying party servers, one or more services in the virtual, cloud-based environment for use by the user agent. In an example use case, the first relying party 406A may be associated with a relying party server of an entity that an employee logs into for authentication to access the virtual, cloud-based environment (e.g., a virtual desktop, a virtual application, a virtual mobile app, or other virtual service(s)). Services of other relying parties (e.g., a second relying party 406B) may be provided, via the relying party servers, to user agent 404 via the virtual, cloud-based environment. For example, the services of other relying parties may be provided in the virtual, cloud-based environment as virtual apps. Different relying parties 406 may be associated with different entities. For instance, the first relying party 406A may be associated with a first company while the second relying party 406B may be associated with second (different) company.

The virtual, cloud-based environment may be a claims aware (e.g., claims-based) application that provides services from a variety of different relying parties 406. In some examples, security token services (STS) (e.g., first identity provider 412A) issue tokens to an authenticated user as a result of successfully completing an authentication procedure (e.g., logging in), which are used by a first relying party 406A. The first relying party 406A may provide user agent 404 access to its own resources and services using the STS token. In one example, the user, via user device 402, may log into a virtualized, cloud-based environment using their existing authentication credentials, which may be a username and password, biometric measurement (e.g., fingerprint scan, retina scan, facial recognition, voice recognition, etc.), entering an access code provided to a specified user device (e.g., the user's smartphone may receive a message containing a code to enter into a portal provided by the relying party), or any other authentication means. In response, STS (e.g., first identity provider 412A) may issue the STS token. As used herein, a "token" may itself be an identity or may be associated with an identity such as, for example, an STS identity.

Figure 5:
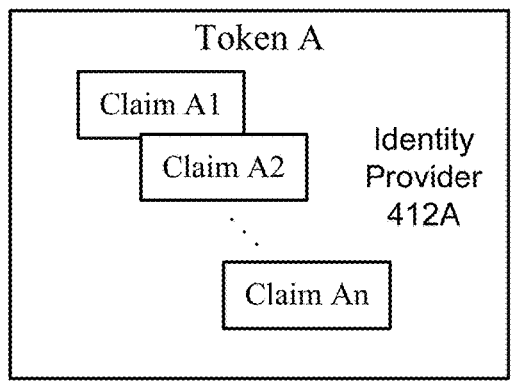
FIGS. 5 and 6 depict illustrative tokens in accordance with one or more illustrative aspects described herein.

FIG. 5 depicts an illustrative token of first identity provider 412A for use with services provided by first relying party 406A in accordance with one or more illustrative aspects described herein. As shown in FIG. 5, token A (e.g., STS token) may include one or more claims (e.g., claim A1, claim A2, ... claim An) that have been issued only by first identity provider 412A. As used herein a claim may be a statement about a user made by composite identity server 408, federated microservice 410, or identity provider 412. As an example, one claim may be an authenticated method reference (AMR) claim, which reveals the way the user authenticated (e.g., password, retinal, two-factor, etc.). A claim-aware application (e.g., the virtual, cloud-based environment) may acquire user identity information using the claim to permit access to resources and services.

When a user initially logs into identity provider 412 and accesses first relying party 406A, the STS token (e.g., token A) may be user's current default data structure. A data structure is a "default" data structure if it is the data structure that at least one of the components of the system 400 is configured to always return in communications with services.

System 400 may include composite identity server 408, which may be a server responsible for providing an identity platform. Specifically, composite identity server 408 may be responsible for generating, updating, and managing composite tokens of users for use in the virtual, cloud-based environment. Relying parties 406 rely on the claims of different authentication tokens to authorize user agent 404 to access services provided by different relying parties 406. Additionally, relying parties 406 406 may wish to rely on an identity platform provided by composite identity server 408 to authorize a user of user agent 404. For instance, relying parties 406A and 406B may rely on different claims provided respectively by identity providers 412A and 412B from an upgraded token (also referred to herein as a "composite token") for the user and for use by user device 402 for services provided by relying parties 406A and 406B.

System 400 may include one or more identity providers 412 that are trusted by one or more relying parties 406 and/or composite identity server 408. For example, system 400 may include a first identity provider 412A and a second identity provider 412B different from first identity provider 412A. Identity providers 412 may provide authentication tokens with each authentication token having one or more claims. Relying parties 406 may be responsible for providing authentication tokens to authorize user agent 404 to access various services in the virtual, cloud-based environment. Following the example depicted in FIG. 4, first relying party 406A may provide a first service in the virtual, cloud-based environment and second relying party 406B may provide a second service (different from the first service) in the virtual, cloud-based environment. Illustrative services include cloud applications, productivity tools, social media services, etc. Identity providers 412 may be associated with an entity different from or same as an entity with which relying party 406 and/or composite identity server 408 are associated.

Figure 6:
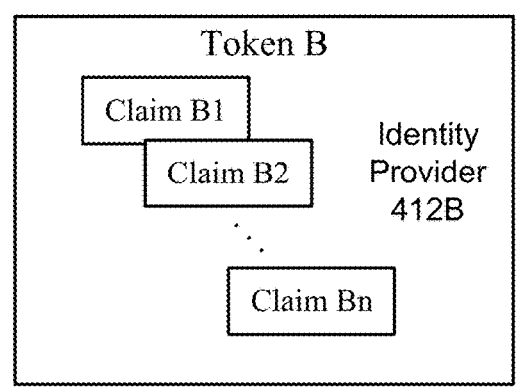

As discussed above, identity providers 412 may be responsible for providing tokens specific to that identity provider so that user agent 404 may access the resources/services in the virtual, cloud-based environment provided by relying parties 406. As an example, second identity provider 412B may provide a second token (e.g., token B) for a user, which may be stored by second relying party 406B or user device 402. When user device 402 attempts to access secured services of second relying party 406B, either user device 402 or second relying party 406B may provide the second token to second identity provider 412B for authentication of the user. If the user is authenticated, second relying party 406B may permit user device 402 to access its secured services in the virtual, cloud-based environment. FIG. 6 depicts an illustrative second token of second identity provider 412B for use with services provided by second relying party 406B in accordance with one or more illustrative aspects described herein. As shown in FIG. 6, token B may include one or more claims (e.g., claim B1, claim B2, ... claim Bn) that have been issued only by second identity provider 412B. Claims issued by other identity providers (e.g., first identity provider 412A) might not be included in token B.

A relying party 406 may only be able to rely on claims from a token issued by a particular identity provider 412. For instance, first relying party 406A may only be able to rely on claims from token A while second relying party 406B may only be able to rely on claims from token B. Thus, token A might not be sufficient to permit the user agent 404 access to the second service since the second service is provided by second relying party 406B and the second service uses a token specific to second identity provider 412B. These identity-provider-specific tokens may be provided to composite identity server 408, which may then use the tokens to generate a composite token for the user so that the user agent 404 may interact with services associated with different relying parties 406 in the virtual, cloud-based environment.

System 400 may include one or more federated microservices 410, which may be responsible for managing and interpreting tokens of corresponding identity providers 412. Each federated microservice 410 may be a standalone microservice specific to a different identity provider 412. In the example depicted in system 400, first federated microservice 410A may be specific to first identity provider 412A and second federated microservice 410B may be specific to second identity provider 412B. By implementing each federated microservice as a standalone microservice specific to a different identity provider 412, composite identity server 408 may separately manage and operate them.

In some instances, federated microservices 410 may be part of the entity associated with the composite identity server 408, but may be embodied in servers other than the composite identity server 408. In other instances, each of federated microservices 410 may part of their corresponding identity provider 412.

One or more federated microservices 410 may provide logic to understand tokens issued by their corresponding identity provider 412. Following the above example, first federated microservice 410A may interpret tokens issued by first identity provider 412A and second federated microservice 410B may interpret tokens issued by second identity provider 412B. However, first federated microservice 410A might not understand and/or otherwise be able to interpret tokens issued by second identity provider 412B and second federated microservice 410B might not understand and/or otherwise be able to interpret tokens issued by first identity provider 412A.

In interpreting a token issued by an identity provider 412, a federated microservice 410 may transform the token. Federated microservice 410 may interpret each of the claims of the token, and transform the claims by, for example, modifying one or more token's claims. The federated microservice 410 may also obtain updated tokens (e.g., updated claims) as will be explained in additional detail below.

Additionally, federated microservice 410 may identify which of the token's claims to include in a composite token for the user, which may be based on which claims have a relatively high probability of being used when the user's user agent 404 accesses a service of the corresponding relying party 406 in the virtual, cloud-based environment. The federated microservice 410 may inform composite identity server 408 of which claims should be included in the user's composite token.

The federated microservice 410 may identify which of the token's claims to include in the user's profile for storage, which may be based on which claims might not likely be used when the user's user agent 404 accesses the service of the corresponding relying party 406 in the virtual, cloud-based environment. The federated microservice 410 may also inform composite identity server 408 of which claims should be stored in the user's profile. In many instances, the claims designated for storage in the user's profile may be the remainder of claims included in the token that were not identified to be included in the user's composite token.

System 400 may include a profiles microservice 414, which may be responsible for storing claims of users' tokens issued by different identity providers 412. Profiles microservice 414 may be a database (e.g., a structure query language (SQL) database or other relational database) organized by one or more of: database record identifiers, user identifiers of users, identity provider identifiers of identity providers 412, relying party identifiers of corresponding relying parties 406, token identifiers of tokens, and claims identifiers of token claims. Profiles microservice 414 may be associated with the same entity as the composite identity server 408. In one or more alternative arrangements, profiles microservice 414 might not be part of the same entity as composite identity server 408.

For a given user, the database of profiles microservice 414 may include one or more records specific to the user. Each record may be specific to a different claim of the various tokens issued to the user. Multiple records of the user may be grouped together. For instance, each of the claim-specific records of the user corresponding to the same token may be grouped together and assigned the same token identifier and/or identity provider identifier.

In many instances, for the given user, the database of the profiles microservice 414 stores only those claims of the user's tokens that are not part of the user's composite token. In such instances, all of the claims of the given user's tokens may be either part of the composite token or stored in the database. In some instances, redundant copies of claims that are part of the user's composite token may be stored in the database so that the database has complete claim sets for each of the user's tokens. In instances where a claim has been modified and/or otherwise transformed by its corresponding federated microservice 410 for inclusion in the user's composite token, an unmodified version of the claim may be stored in the database to restore the modified claim to its original form if needed.

The composite identity server 408 may wish to interact with the database of the profiles microservice 414, which may be performed using any database command language such as, for example, SQL. As an example, composite identity server 408 may send claims of a user's token for storage. As another example, composite identity server 408 may, on demand, retrieve claims associated with a particular user from profiles microservice 414. Because the composite token does not include all claims for each the user's tokens, in some cases, a relying party 406 may wish to obtain claims that are not part of the user's composite identity when, for example, services provided by the corresponding relying party 406 desire such claims. In such cases, composite identity server 408 may retrieve, from profiles microservice 414, the claims of the user's token for that service that are missing from the user's composite token and that are requested by the corresponding relying party 406. The messages may include one or more of the user's user identifier, token identifier(s), identity provider identifier(s), relying party identifier(s), and/or claim identifier(s). For instance, a message sent from identity server 408 may request to retrieve all claims (or a subset thereof) stored in the database that is associated with a particular token for a particular user device.

Profiles microservice 414 may also be responsible for managing and updating claims. For instance, profiles microservice 414 may delete expired claims and obtain updated claims from federated microservices 410.

System 400 may include a principals microservice 416, which may be responsible for returning information about users within the identity access platform. As an example, if a user has an existing login with a particular service or relying party 406, the existing login information may be retrieved by composite identity server 408. Principals microservice 416 may be part of the same entity or a different entity as the composite identity server 408. In some instances, principals microservice 416 may be a relational database of user identifiers and known information about the users and user devices 402.

In some cases, a relying party 406 may wish to provide support for services of other relying parties in the virtualized, cloud-based environment. In such cases, relying party 406 may additionally wish to provide user device 402 with the ability to use such services using their existing identities by upgrading their identities. Specifically, because the virtual, cloud-based environment is claims aware, the users' identities may be upgraded by modifying claims of users' identities to form a composite token.

Figure 7:
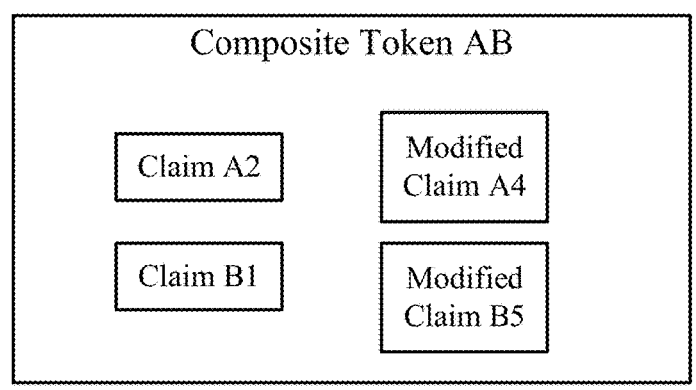
FIG. 7 depicts an illustrative composite token generated based on the illustrative tokens depicted in FIGS. 5 and 6 in accordance with one or more illustrative aspects described herein.

FIG. 7 depicts an illustrative composite token generated by composite identity server 408 and based on the illustrative tokens depicted in FIGS. 5 and 6 in accordance with one or more illustrative aspects described herein. As shown in FIG. 7, composite token AB may include one or more claims (e.g., claim A2) of token A and one or more claims of token B (e.g., claim B1). Additionally, composite token AB may include one or more modified claims from token A or token B (e.g., modified claim A4, modified claim B5, etc.). A user's current default data structure, which may initially be token A (e.g., the STS token for use with services of first relying party 406A), may be upgraded by appending claims (e.g., claim B1) of token B received from second identity provider 412B to claims of the user's current default data structure (e.g., token A), modifying claims of the user's current default data structure (e.g., modified claim A4), removing claims of the user's current default data structure (e.g., claim A1), and modifying claims received from the second identity provider 412B (e.g., modified claim B5) and appending such claims to the user's current default data structure. One or more of the claims in the composite token AB may be an identity provider's user identifier, an identifier of the particular direct entity, a tenant the user logged into, an AMR claim, etc. At this point, the current default data structure may now be composite token AB rather than token A. Thus, composite token AB may now always be returned by in communications with services. Using composite token AB stored by one or more of the relying parties 406, user device 402 may access services of both first relying party 406A and second relying party 406B in the virtual, cloud-based environment.

Figure 8:
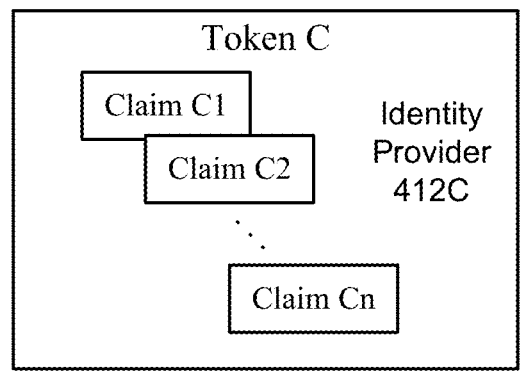
FIG. 8 depicts an illustrative token of another identity provider in accordance with one or more illustrative aspects described herein.
Figure 9:
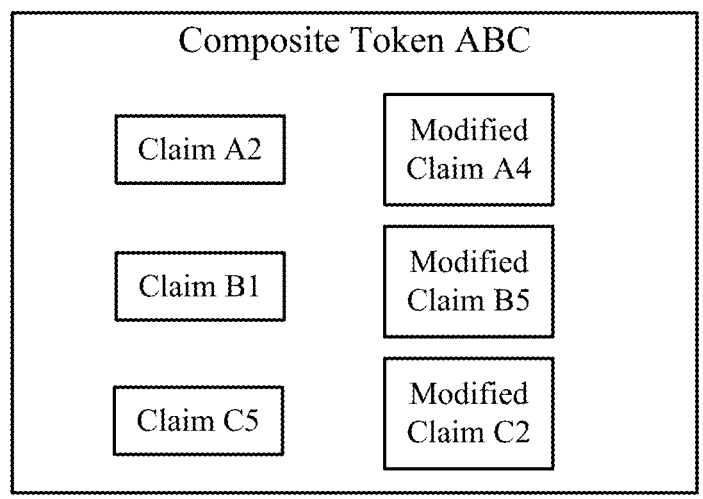
FIG. 9 depicts an illustrative composite token generated based on the illustrative tokens depicted in FIGS. 5, 6, and 8 in accordance with one or more illustrative aspects described herein.

In some cases, user device 402 may wish to access resources of a different relying party (e.g., a third relying party associated with a third identity provider 412C and third federated microservice 410). In such cases, the user may authenticate with a third identity provider 412C and, if successful, be issued the third token by third identity provider 412C. FIG. 8 depicts an illustrative token (e.g., token C) of a third identity provider 412C for use with services provided by a third relying party in accordance with one or more illustrative aspects described herein. As shown in FIG. 8, token C may include one or more claims (e.g., claim C1, claim C2, . . . claim Cn). FIG. 9 depicts an illustrative composite token generated based on the illustrative tokens depicted in FIGS. 5, 6, and 8 in accordance with one or more illustrative aspects described herein. At this point, composite token ABC may replace composite token AB as the default data structure for the user in the virtual, cloud-based environment that is always returned in communications with services. As a result, user device 402 may now access services provided by first relying party 406A, second relying party 406B, and the third relying party without having to re-authenticate each time the user agent wishes to switch services provided by different relying parties 406 to produce a single-sign-on experience.

Figure 10A:
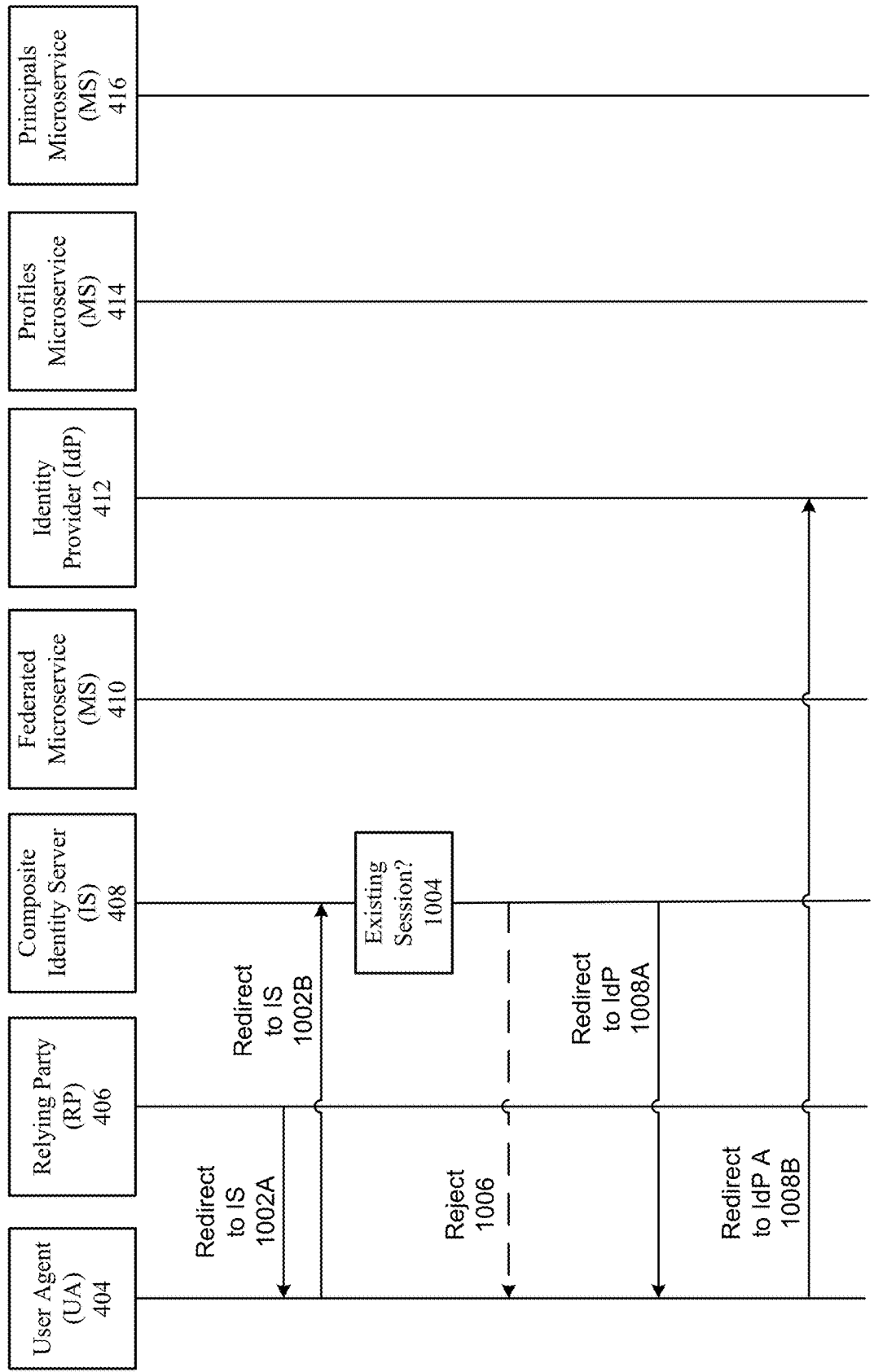
Figure 10B:
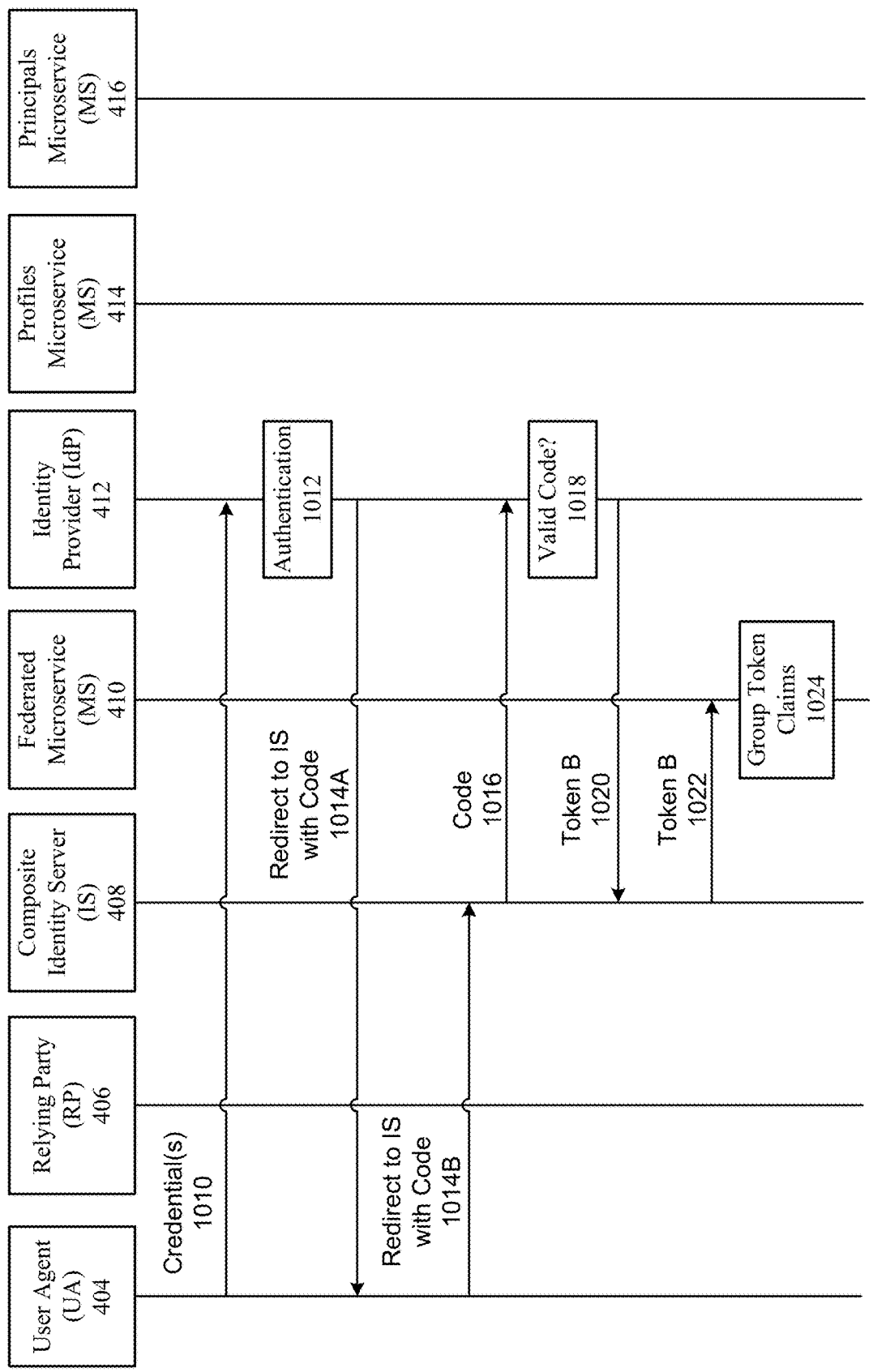

FIGS. 10A-10C depict an illustrative message flow diagram for generating a composite token in accordance with one or more illustrative aspects described herein. Prior to beginning the steps of FIGS. 10A-10C, a user, via user agent 404, may have accessed a virtual, cloud-based environment provided by first relying party 406A via one or more relying party servers. For example, the user may have logged into a virtual desktop, web application, or mobile app. At this point, the relying parties 406 may have access to a base token (e.g., an STS token, token A) for the user issued by first identity provider 412A. The base token may be the user's default data structure returned in communication with services. The user's base token may be issued as a result of the user successfully logging into the virtual, cloud-based environment. Additionally, the user's base token, which may include one or more claims, may be used by first relying party 406A to permit the user agent to access services provided by first relying party 406A in the virtual, cloud-based environment. The virtual, cloud-based environment may include services provided by other relying parties 406 via the one or more relying party servers.

As shown in FIG. 10A, the method may begin at step 1002 in which one of the relying parties 406 (e.g., second relying party 406B) may determine to redirect user agent 404 (e.g., the web browser through which the user is accessing the virtual, cloud-based environment) to composite identity server 408. For example, second relying party 406B may wish to upgrade the user's current default data structure returned in communication with services (e.g., token A) so that the user may access a service provided by the second relying party 406B. As discussed above, token A might not be sufficient to access services provided by the second relying party 406B. While the method described below may refer to a relying party 406, a corresponding identity provider 412, and a corresponding federated microservice 414 generically, in some examples, the relying party 406 may be the second relying party 406B, the identity provider 412 may be the second identity provider 412B, and the federated microservice 410 may be a federated microservice specific 410 specific to the second relying party 406B and/or the second identity provider 412B.

A relying party 406 (e.g., second relying party 406B) may determine to upgrade the user's current default data structure in response to one or more triggering actions. A first triggering action may be a request by user agent 404 to access a service provided by a relying party 406 in the virtual, cloud-based environment. A second triggering action may be a request by user agent 404 to access a service having a two-factor authentication protocol (e.g., submission of a token code or a symmetric private key in a public key/private key system such as an Rivest-Shamir-Adleman (RSA) key). A third triggering action may be that relying party 406 wishes to upgrade the user of a service of a relying party 406 to an administrator in the virtual, cloud-based environment while maintaining access to their administrator console. A fourth triggering action may be a user preference set by the user in the virtual, cloud-based environment to obtain a particular token upon logging into the virtual, cloud-based environment.

In response to determining that one or more triggering action have been triggered, a relying party 406 (e.g., second relying party 406B) may identify the service for which the upgraded default data structure (e.g., the composite token) will be used and/or its corresponding identity provider 412, and provide this information to user agent 404 when relying party 406 redirects user agent 404 to composite identity server 408.

In redirecting user agent 404 to composite identity server 408, steps 1002A and 1002B may be performed. In step 1002A, relying party 406 may send user agent 404 a redirect message, which causes user agent 404 to, in turn, access composite identity server 408. The redirect message may include a destination address of composite identity server 408. For instance, the destination address may be a website address or other uniform resource locator (URL). As noted above, the redirect message may include an identifier of the service and/or identity provider 412 for which relying party 406 wishes the user to have an upgraded data structure. As an example, the redirect message may include an identifier for the second service and/or the corresponding second identity provider 412B. In some instances, the redirect message may also include the user's user identifier.

The redirect message may additionally include authentication context class (ACR) values specified by relying party 406. In some instances, the ACR values may be OpenID compliant. Redirect messages including such ACR values will operate as a request for the composite identity server 408 to perform some action. The ACR values provide context for what the relying party 406 wants to do with the upgraded default data structure. As an example, the ACR indicates token upgrade, which, for example, may act as a request for composite identity server 408 to upgrade the user's current default data structure (e.g., token A) and trigger the composite identity server 408 to upgrade the user's current default data structure. Following the above example, the ACR value may be a request for composite identity server 408 to upgrade the user's default data structure for use with second service provided by second relying party 406B in the virtual, cloud-based environment. Additional ACR values may provide upgrade parameters. As an example, an ACR value may be idp: <provider_name> or tenant: <auth_domain>, each of which may indicate an external identity provider 412 relying party 406 wishes to attach. Another ACR value may indicate authentication mechanism such as two-factor authentication.

Composite identity server 408 may, in response to receiving the redirect message (and its corresponding contents (e.g., ACR value, service identifier, identity provider identifier, and/or user identifier)) from user agent 404, begin the default data structure upgrade process (e.g., the remaining steps of FIGS. 10A-10C), which in this instance may be an upgrade to token A.

At step 1004, composite identity server 408 may, in response to determining that relying party 406 is requesting to upgrade the user's current default data structure, verify that user agent 404 is involved in a valid identity login session associated with relying party 406 or the relying party server. For instance, composite identity server 408 may verify that user agent 404 has an existing cookie-based session with relying party 406 or the relying party server.

If there is not a valid identity login session, then, at step 1006, composite identity server 408 may reject the upgrade request and provide user agent 404 with a rejection notification (e.g., an error page stating that the upgrade cannot be performed). In some cases, the rejection notification may also indicate the reasons for the rejection (e.g., that there is not current valid login session) and provide one or more remedies (e.g., a suggestion to re-login or to contact an administrator for help). The process then ends.

Otherwise, if there is a valid login session, composite identity server 408 may determine that it may continue to perform the default data structure upgrade (e.g., the upgrade to token A), and may, at step 1008, redirect user agent 404 to the appropriate identity provider 412 for authentication. In some cases, the appropriate identity provider 412 may be the identity provider 412 specified in the message composite identity server 408 received from user agent 404. In some cases, the appropriate identity provider 412 may be the identity provider 412 identified by composite identity server 408 as being associated with the service specified in the redirect message identity provider 408 received from user agent 404. Following the above example, identity provider 408 may redirect user agent 404 to second identity provider 412B.

In redirecting user agent 404 to the appropriate identity provider 412 for authentication, steps 1008A and 1008B may be performed. In step 1008A, composite identity server 408 may send user agent 404 a redirect message, which causes user agent 404 to, in turn, access identity provider 412. The redirect message may include a destination address of identity provider 412. For instance, the destination address may be a website address or other uniform resource locator (URL).

As a result of the redirection, user agent 404 may display a portal (e.g., a website) of identity provider 412 through which the user may authenticate the user with identity provider 412. Referring now to FIG. 10B, at step 1010, in response to a request by identity provider 412, user agent 404 may send, to identity provider 412, the user's authentication credentials specific to that identity provider for authentication. As an example, the website may be a login screen and the user may enter user's login information (e.g., a username and password) into the screen for authentication by identity provider 412.

In some cases, additional or alternative authentication credentials may be provided by user agent 404. For instance, in two-factor authentication, identity provider 412 may request a private cryptographic key (e.g., a token key or an RSA key). Additionally or alternatively, identity provider 412 may request a biometric measurement of the user (e.g., a fingerprint scan, a retinal scan, facial picture for facial recognition, voice recording for voice recognition, etc.). In response, the user's computing device 402 (or another device) may measure the user's biometric data, which user agent 404 may then send to identity provider 412 for authentication.

At step 1012, identity provider 412 may authenticate the user based on the user's authentication credentials provided by user agent 404. For instance, identity provider 412 may compare the user's provided authentication credentials with authentication credentials of the user previously stored by identity provider 412 (e.g., during a user registration process). If there is not a match, identity provider 412 may inform the user, via user agent 404, that the user's provided authentication credentials are invalid and may permit the user to resubmit the user's authentication credentials. If user agent 404 continues to provide invalid authentication credentials for a maximum preset threshold number of times, identity provider 412 may deny user agent 404 access to identity provider's 412 resources and the process may end thereby preventing the remaining steps being performed.

Otherwise, if the user's provided authentication credentials match the previously stored authentication credentials of the user, identity provider 412 may determine the user's provided authentication credentials are valid and, in response, may, at step 1014, redirect user agent 404 back to composite identity server 408. The redirect message may include an authorization code associated with identity provider 412 so that identity provider 412 may later authenticate composite identity server 408. A copy of the authorization code may be stored by identity provider 412 to compare with an authorization code that may later be received from composite identity server 408.

The authorization code may be an alphanumeric string with one or more symbols. In some instances, the redirect message may identify the user, user agent 404, user computing device 402, relying party 406, identity provider 412, and/or the composite identity server 408, which in some cases may be part of the authorization code. In some instances, the authorization code may be encrypted by identity provider 412 prior to insertion into the redirect message. In such instances, identity provider 412 may also include a decryption key identifier of a decryption key stored by identity provider 412. However, the decryption key itself is not part of the redirect message.

In redirecting user agent 404 back to composite identity server 408, steps 1014A and 1014B may be performed. In step 1014A, composite identity server 408 may send the user agent 404 a redirect message, which causes user agent 404 to, in turn, access composite identity server 408. The redirect message may include a destination address of composite identity server 408. For instance, the destination address may be a website address or other uniform resource locator (URL).

At step 1016, in response to receiving the authorization code associated with identity provider 412, composite identity server 408 may forward the authorization code associated with identity provider 412 to identity provider 412. For instance, composite identity server 408 may identify identity provider 412 to send the authorization code by inspecting the redirect message and/or the authorization code (if unencrypted). Composite identity server 408 may then inform identity provider 412 (e.g., by providing a user identifier to identity provider 412) that the user is currently logged into this system and provide this authorization code to composite identity server 408. Composite identity server 408 may also request identity provider 412 to issue a token for the user and that is specific to identity provider 412.

In another example, identity providers 412 may implement an OpenID Connect protocol. In such an example, the authorization code associated with identity provider 412 may be attached to user agent 404 (e.g., the browser) which eventually accesses composite identity server 408. Composite identity server 408 may extract the authorization code from user agent 408 and forward the code to identity provider 412. While OpenID Connect protocol is described above, other protocols may be used.

At step 1018, identity provider 412 may determine whether the authorization code associated with the identity provider 412 received from composite identity server 408 is valid. An authorization code may be valid if identity provider 412 issued the authorization code. As discussed above, identity provider 412 stored a copy of the authorization code included in the redirect message during step 1014. Identity provider 412 may compare the authorization code received from composite identity server 408 with the copy of the authorization code. If the authorization codes do not match, the authorization code received from composite identity server 408 may be invalid and the process may end thereby preventing the remaining steps from being performed. Otherwise, if the authorization codes match, the authorization code received from composite identity server 408 may be valid and, as a result, identity provider 412 may consider composite identity server 408 authenticated. In some instances, the authorization code received from composite identity server 408 may have been encrypted. In such instances, composite identity server 408 may also forward the decryption key identifier composite identity server 408 received in the redirect message of step 1014. Using the decryption key identifier, composite identity server 408 may identify a decryption key and decrypt the authorization code. Composite identity server 408 may then determine whether the authorization code is valid.

In response to authenticating composite identity server 408 via the authorization code, identity provider 412 may, at step 1020, generate an authentication token specific to identity provider 412 (e.g., token B specific to second identity provider 412B depicted in FIG. 6) and send the token to composite identity server 408. This token may be referred to hereinafter as a second token (with the user's base STS token being a first token). The second token may include one or more claims and may also be specific to the user of user agent 404. Additionally, the second token may be used by relying party 406 to authenticate the user of user agent 404 when accessing services provided by relying party 406 in the virtual, cloud-based environment.

At this point, identity provider 412 and composite identity server 408 each understand that they both are referring to the same user login event and the same request to obtain the second token for the user.

In response to receiving the second token (e.g., the user's token specific to identity provider 412), composite identity server 408 may, at step 1022, send the second token to a federated microservice 410 that is also specific to identity provider 412. As discussed above in connection with FIG. 4, system 400 may include multiple federated microservices 410 (e.g., a first federated microservice 410A, a second federated microservice 410B, and so on). Each federated microservice 410 may be specific to a different identity provider 412 and include self-contained logic to interpret and transform tokens of that identity provider 412.

At step 1024, the appropriate federated microservice 410 that is specific to the same identity provider 412 as the second token may transform the claims of the second token by grouping the second token's claims into a group of claims designated to be included in the user's composite token or a group of claims designated for storage at profiles microservice 414. During use of a service in the virtual, cloud-based environment, the user's current default data structure may always be returned, which may initially be the user's base or first token (e.g., token A). Other user data might only be returned on-demand Because the user's composite token will replace the user's current default token (e.g., the user's base token) as the user's current default data structure, the user's composite token will always be returned. As a result, federated microservice 410 may wish to select claims for inclusion in the user's composite token based on whether the claim should always be returned in communications with services provided by the relying party 406 associated with the identity provider 412 that issued the second token. Other claims might only be useful in some instances. In such instances, the user's composite token might not include such claims and, thus, such claims might not be returned by default. Rather, these claims may be available on-demand from a profiles microservice 414. The claims may be designated for one of the two groups using tags or other identifiers.

In one implementation, administrators of federated microservice 410 may set policies to select claims or claim-types to be included in the user's composite token. For instance, one policy may be to select a claim identifying the user's user identifier for the identity provider 412. Another policy may be to select a claim identifying a direct entity or tenant the user has logged into. In some cases, federated microservice 410 may, based on a policy, select a particular claim and alter and/or otherwise modify the claim. The alteration may be to conform the claim to a particular protocol (e.g., formatting changes) for interpretation by relying party 406 or composite identity server 408.

As noted above, the composite token (e.g., composite token AB) will replace the user's current default data structure (e.g., token A) and, thus, the composite token may be returned by default. Because the default data structure may always be returned for each communication with a service, federated microservice 410 may wish to minimize the size of the composite token, which may be based on a predicted likelihood (or predicted frequency) of use of a particular claim, a size of the particular claim, or a combination thereof.

For instance, the determination of whether a claim should be included in the user's composite token may be based on a likelihood the claims will be used when the user's user agent 404 accesses a service of the relying party 406 associated with the identity provider 412 that issued the claim in the virtual, cloud-based environment. Federated microservice 410 may track in a historical log how often a claim or claim-type is used as user devices 402 access services provided by relying party 406 in the virtual, cloud-based environment, which may be reported to federated microservice 410 by one or more of relying party 406, composite identity server 408, and/or identity provider 412. Claims used more frequently may receive a higher likelihood of use score. If the claim's likelihood of use score is equal to or above a minimum likelihood threshold value, the claim may be identified to be included in the user's composite token. If the claim's likelihood of use score is below the minimum likelihood threshold value, the claim might not be identified to be included in the user's composite token. Instead, the claim may be designated for storage at the profiles microservice 414. As a result, a subset of claims of the second token may be designated for inclusion in the user's composite token and another subset of claims of the second token may be designated for storage at the profiles microservice 414.

For instance, the determination of whether a claim should be included in the user's composite token may be based on the size of the claim. If the claim is above a preset maximum non-zero size threshold, the claim might not be included in the composite token and instead may be designated for storage at profiles microservice 414. Otherwise, if the claim is equal to or below the maximum non-zero size threshold, the claim may be included the user's composite token.

In one arrangement, each of the claims of the second token may be a member of one of the two groups (e.g., the group of claims designated for inclusion in the user's composite token or the group of claims designated for storage at profiles microservice 414). However, in some arrangements, one or more claims of the second token may be deleted and might not be part of either group. In such instances, an administrator of federated microservice 410 may set a policy to identify and delete claims that are not useful when the user agent 404 access services, in the virtual, cloud-based environment, provided by relying party 406 associated with the identity provider 412 that issued the claim.

Referring now to FIG. 10C, at step 1026, federated microservice 410 may send, to composite identity server 408, the two token claim groups. For instance, each of the claims along with the respective claim's designation (e.g., an indication or tag indicating whether the claim is designated for inclusion in the user's composite token or is designated for storage at profiles microservice 414). As an example, federated microservice 410 may send a first claim of the second token with an indication that the first claim is designated for inclusion in the user's composite token. Federated microservice 410 may send a second claim of the second token with an indication that the second claim is designated for storage at profiles microservice 414.

As discussed above, in some instances, federated microservice 410 may have altered one or more claims of the second token for inclusion the user's composite token. In such instances, in addition to sending the altered claims and their designation for inclusion in the user's composite token, federated microservice 410 may also send, to composite identity server 408 and for each altered claim, one or more of an indication (e.g., a tag) that the claim was altered, a description of how the claim was altered (e.g., what information was deleted, added, etc.), and/or a copy of an unaltered version of the altered claim with a designation for storage at the profiles microservice 414 to permit restoration of the original claim.

As also discussed above, in some instances, federated microservice 410 may have deleted one or more claims of the token. In such instances, federated microservice 410 may send, to composite identity server 408 and for each deleted claim, an identifier of the claim (e.g., identity provider's 412 unique claim identifier) and an indication that the claim was deleted.

At step 1028, composite identity server 408 may send, to profiles microservice 414, the claims of the second token designated, by federated microservice 410, for storage at profiles microservice 414. At step 1030, profiles microservice 414, may store the claims designated for storage and delete expired claims. As discussed above in connection with FIG. 4, profiles microservice 414 may include a database (e.g., a SQL or other relational database), which may be interacted with by composite identity server 408 using a database command language (e.g., SQL).

The database may be organized by one or more of: database record identifiers, user identifiers of users, relying party identifiers of relying parties 406, identity provider identifiers of identity providers 412, token identifiers of tokens, and claims identifiers of token claims. In response to receiving the claims from composite identity server 408, profiles microservice 414 may store the claims designated for storage in its database with each claim being stored in a different record of the database. Each record may be assigned one or more of the above-listed organizational identifiers, which may have also been sent by the composite identity server 408 to profiles microservice 414 with the claims.

Additionally, profiles microservice 414 and/or its corresponding database may assign a lifetime or time-to-live (TTL) value for each claim received from composite identity server 408. Once a claim has been stored in the database, the database may track how long the claim has been stored in the database without being refreshed. The time period may start with the initial storage and may be restarted if the database refreshes the claim. If the time period does not exceed the lifetime or TTL value, the database might not delete the claim. Otherwise, if the time period exceeds the lifetime or TTL value, the database may automatically delete the claim from the database and send a notification of the claim's deletion to composite identity server 408, which may, in turn, notify one or more of user agent 404, relying party 406, federated microservice 410, or identity provider 412 of the claim's deletion from the database. An unexpired claim may be refreshed (thereby restarting the time period) in response to receiving a communication from composite identity server 408 or federated microservice 410 corresponding to one or more user identifiers associated with the claim, a token identifier associated with the claim, a claim identifier of the claim, or an identity provider identifier associated with the claim.

In instances where the database associated with the profiles microservice 414 is provided by an entity different from the entity providing profiles microservice 414, profiles microservice 414 may interact and/or otherwise communicate with the database to effectuate the above-described database functionalities.

Once the claims designated for storage have been stored and their corresponding TTL values have been updated in the database associated with the profiles microservice 414, profiles microservice 414 may, at step 1032, send, to composite identity server 408, a confirmation of the claims' storage.

In response to receiving the storage confirmation, composite identity server 408 may, at step 1034, redirect user agent 404 back to relying party 406 along with an authorization code associated with composite identity server 408 for authentication of relying party 406. This process is similar to the redirection with authorization code performed in steps 1014-1018. The redirect message may include an authorization code associated with composite identity server 408 so that composite identity server 408 can later authenticate relying party 406. A copy of the authorization code may be stored by composite identity server 408 to compare with an authorization code that will later be received from relying party 406.

The authorization code associated with composite identity server 408 may be an alphanumeric string with one or more symbols. In some instances, the redirect message may identify the user (e.g., user identifier), user agent 404, user device 402, relying party 406, identity provider 412, and/or the composite identity server 408, which in some cases may be part of the authorization code. In some instances, the authorization code may be encrypted by composite identity server 408 prior to insertion into the redirect message. In such instances, composite identity server 408 may also include a decryption key identifier of a decryption key stored by composite identity server 408. However, the decryption key itself might not be part of the redirect message.

In redirecting user agent 404 to relying party 406, steps 1034A and 1034B may be performed. In step 1034A, composite identity server 408 may send user agent 404 a redirect message, which causes user agent 404 to, in turn, access relying party 406. The redirect message may include a destination address of relying party 406. For instance, the destination address may be a website address (e.g., the website or portal of the virtual, cloud-based environment) or other uniform resource locator (URL).

At step 1036, in response to receiving the authorization code associated with composite identity server 408, relying party 406 may forward the authorization code associated with composite identity server 408 to composite identity server 408. For instance, relying party 406 may identify the composite identity server 408 to send the authorization code by inspecting the redirect message and/or the authorization code (if unencrypted). Relying party 406 may then inform composite identity server 408 (e.g., by providing a user identifier to the composite identity server 408) that the user is currently logged into this system and may provide this authorization code to relying party 406. Relying party 406 may also request for the composite identity server 408 to generate the user's composite token.

In another example, composite identity server 408 may implement the OpenID Connect protocol. In such an example, the authorization code associated with composite identity server 408 may be attached to user agent 404 (e.g., the browser) which eventually accesses relying party 406. Relying party 406 may extract the authorization code from user agent 406 and forward the code to composite identity server 408. While OpenID Connect protocol is described above, other protocols may be used.

At step 1038, composite identity server 408 may determine whether the authorization code associated with composite identity server 408 received from relying party 406 is valid. An authorization code may be valid if composite identity server 408 issued the authorization code. As discussed above, composite identity server 408 stored a copy of the authorization code included in the redirect message during step 1034. Composite identity server 408 may compare the authorization code received from relying party 406 with its stored copy of the authorization code. If the authorization codes do not match, the authorization code received from relying party 406 may be invalid and the process may end thereby preventing the remaining steps being performed. Otherwise, if the authorization codes match, the authorization code received from relying party 406 may be valid and, as a result, composite identity server 408 may consider relying party 406 authenticated. In some cases, the authorization code associated with composite identity server 408 was encrypted by composite identity server 408. In such cases, composite identity server 408 may have included in the redirect message of step 1034 a decryption key identifier, which relying party 406 may forward to composite identity server 408. Composite identity server 408 may identify the decryption key using the decryption key identifier, decrypt the authorization code, and determine whether the authorization code is valid.

At this point, composite identity server 408 and relying party 406 each understand that they both are referring to the same user login event and the same request to obtain a composite token for the user.

In response to determining that the authentication code associated with composite identity server 408 is valid, composite identity server 408 may, at step 1040, generate the user's composite token (e.g., composite token AB). As discussed above in step 1026, composite identity server 408 received claims of the second token specific to identity provider 412 and designated for inclusion in the user's composite token. Composite identity server 408 may append these claims to the user's current default data structure (e.g., token A) to create the user's composite token. As a result, the composite token may include a subset of the claims of the second token, which may be specific to identity provider 412. In some instances, some of the appended claims may have been altered by federated microservice 410. In one example, the user's current data structure may be token A depicted in FIG. 5 and the second token specific to identity provider 412 may be token B depicted in FIG. 6. The resulting composite token may be composite token AB depicted in FIG. 7. In some cases, composite identity server 408 may remove claims of the user's default data structure (e.g., claim A1 of token A) and store these claims at profiles microservice 414 for subsequent, on demand retrieval.

At step 1042, composite identity server 408 may send, to relying party 406, the user's composite token (e.g., composite token AB), which may be used by relying party 406 to authenticate user agent 404 when accessing services provided by relying party 406 in the virtual, cloud-based environment. For example, composite token AB depicted in FIG. 7 may be used to access services provided by first relying party 406A in the virtual, cloud-based environment since composite token AB has the appropriate claims of token A. Composite token AB may also be used to access services provided by relying party 406B in the virtual, cloud-based environment since composite token AB has the appropriate claims of token B.

As discussed above, in some cases, the request to upgrade the user's current default data structure may have been generated in response user agent 404 requesting to access a resource associated with two-factor authentication. For instance, the user's current default data structure may state that the user has authenticated via a username and password. However, the requested service may be more securely protected and, thus, be assigned a second authentication. In some cases, the secondary authentication may be for submission of a key (e.g., a token key or a private cryptographic key such as an RSA key). In some cases, the secondary authentication may be for submission of a recent/current biometric measurement of the user (e.g., a fingerprint scan, a retinal scan, facial picture for facial recognition, voice recording for voice recognition, etc.).

In some cases, additional or alternative authentication credentials may be provided by user agent 404. For instance, in two-factor authentication, identity provider 412 may request a private cryptographic key (e.g., a token key or an RSA key). Additionally or alternatively, identity provider 412 may request a biometric measurement of the user (e.g., a fingerprint scan, a retinal scan, facial picture for facial recognition, voice recording for voice recognition, etc.). In response to the request, user device 402 (or another device) may measure the user's biometric data, which the user agent 404 may then send to the identity provider 412 for authentication. Once the user successfully passes the secondary authentication associated with identity provider 412, the identity provider token that is issued may include one or more claims that indicate the user passed two-factor authentication and the type of secondary authentication (e.g., key, biometric measurement type, etc.). As an example, a claim may indicate that the user passed a retinal scan. As another example, the identity provider token may include an authentication method reference (AMR) claim, which reveals the way the user authenticated to the identity provider 412. These claims may be included the user's composite token so user agent 404 may access services (e.g., services associated with two-factor authentication) that have a higher level of security than services associated with the base STS token (e.g., token A). In some instances, an AMR claim of the default data structure may be replaced with the AMR claim of the identity provider token. As an example, the AMR claim would be changed from password to retinal. In some instances, an AMR claim of the default token may be modified to include the authentication means specified in the AMR claim of the identity provider token (e.g., when there are multiple different two-factor authentication for different identity providers 412). Using the composite token, relying party 406 may permit user agent 404 to access resources associated with passwords and/or secondary authentication (e.g., retinal scans). In some instances, additional claims may be added to the composite token based on the identity provider token associated with two-factor authentication. As an example, a claim may specify the luminosity of the user's retina or a degree of certainty of the biometric measurement.

The process of FIGS. 10A-10C may be repeated any number of times to obtain tokens associated with different identity providers 412. For instance, if at a later point in time one of the relying parties 406 determines that the composite token should be upgraded again to a different composite token, the process of FIGS. 10A-10C may be repeated. In one example, a third relying party 406 may have composite token AB for the user to access services in the virtual, cloud-based environment. The third relying party 406 may determine that user agent 404 wishes to access services provided by the third relying party 406 in the virtual, cloud-based environment. The third relying party 406 may also determine that the user's current default data structure may be composite token AB and that this token cannot access services provided by the third relying party 406 in the virtual, cloud-based environment. As a result, the third relying party 406 may cause the steps of FIGS. 10A-10C to be repeated but with the user's current default data structure as composite token AB, identity provider 412 as a third identity provider 412C associated with the third relying party, and federated microservice 410 may be specific to third identity provider 412C. Additionally, the token specific to the identity provider 412C may be token C depicted in FIG. 8 and the resulting updated composite token may be composite token ABC depicted in FIG. 9. The updated composite token ABC may be used to interact with service provided by first relying party 406A, service provided by second relying party 406B, and services provided by third relying party 406 in the virtual, cloud-based environment.

Figure 11:
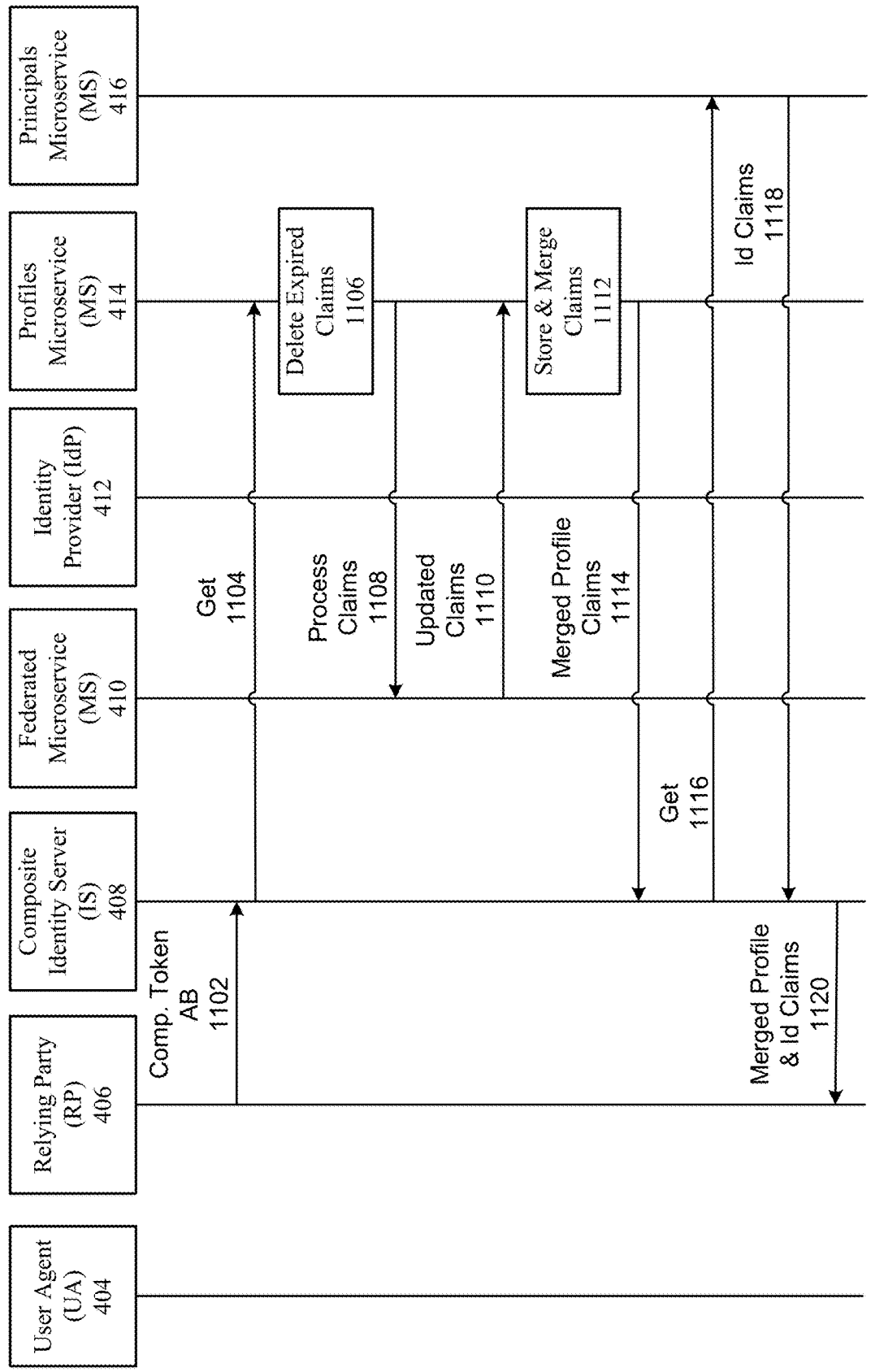
FIG. 11 depicts an illustrative message flow diagram for on demand retrieval of profile claims in accordance with one or more illustrative aspects described herein.

The above-discussed process of FIGS. 10A-10C describe upgrading a user's current default data structure to include additional claims specific to an additional identity provider 412. As also discussed above, one or more claims (also referred to herein as "profile claims") of the user's tokens may have been stored by the profiles microservice 414 for subsequent, on demand retrieval. One of the relying parties 406 may wish to obtain a particular token or one or more profile claims of the particular token so that the relying party 406 may use the particular token or one or more profile claims of the particular token in the context of one of the services provided in the virtual, cloud-based environment. FIG. 11 depicts an illustrative message flow diagram for on demand retrieval of profile claims in accordance with one or more illustrative aspects described herein. Prior to beginning the steps of FIG. 11, a user's composite token may have already been obtained by relying party 406. For instance, the steps of FIGS. 10A-10C may have already been performed at least once and at least one or more claims of the user's tokens may have been stored at the database of profiles microservice 414. In some cases, a complete copy each token received by composite identity server 408 is sent to profiles microservice 414 for storage in its database.

The method may begin at step 1102, in which one of the relying parties 406 may determine to perform an on demand retrieval of a particular token or one or more profile claims of the particular token and, as a result, may send, to composite identity server 408, user information and the user's composite token (e.g., composite token AB). For instance, a relying party 406 (e.g., second relying party 406B) may determine that user agent 404 wishes to use particular resources of the relying party 406 in the virtual, cloud-based environment. Relying party 406 may also determine that none of the claims of the user's composite token (e.g., composite token AB, composite token ABC) are sufficient to permit access to the particular service of relying party 406 in the virtual, cloud-based environment, even though the composite token may include some of the claims from the identity provider 412 associated with that relying party 406 (e.g., claims from token B). In response to determining that none of the claims of the user's composite token are sufficient to obtain access to the particular service, relying party 406 may determine to perform on demand retrieval of the token or profile claims of the token corresponding to the particular service. Following the above example, second relying party 406B may determine to perform on demand retrieval of token B or one or more profile claims thereof.

Relying party 406 (e.g., second relying party 406B) may use the composite token (e.g., composite token AB, composite token ABC) to retrieve, from profiles microservice 414, a token (e.g., token B) used to create the composite token or additional on-demand claims of a token used to create the composite token. For instance, relying party 406 may send a request for the token or its profile claims to composite identity server 408, which may be performed using the OpenID connect standard in some cases. The request may include one or more of the user's composite token, a token or claim identifier, user information (e.g., user identifier, user device 402 identifier, and/or user agent 404 identifier), etc.

In some instances, instead of sending the user's composite token, relying party 406 may only send the one or more claims of the identity provider 412, which may be referred to collectively as an access token of identity provider 412. The access token may be the claims designated for inclusion in the composite token. For example, second relying party 406B may send the one or more claims issued by second identity provider 412 for the user that were designated for inclusion in the composite token. Additionally, in some cases, relying party 406 may send a description of the service causing the on-demand retrieval.

In response to receiving the request (e.g., composite token, access token, user information, etc.) from relying party 406, composite identity server 408 may, at step 1104, send, to profiles microservice 414, a request for the identified token or its profile claims. The request may be a GET command and/or a SQL command. The request may include the user identifier and the access token (e.g., the claims of the composite token that correspond to identity provider 412 of which relying party 406 wishes to obtain the profile claims or full token).

In response to receiving the request from composite identity server 408, profiles microservice 414 may, at step 1106, delete expired claims. As discussed above, profiles microservice 414 assigns a TTL value to each claim. Once a claim has been stored in its database for a time period longer than the TTL value without being refreshed/restarted, profiles microservice 414 may delete the record of that claim, which includes the claim itself.

The remaining profile claims associated with the user stored by profiles microservice 414 may be refreshed so as restart the time period. In some cases, only those profile claims pertaining to the access token may be refreshed. In other cases, all profile claims of different tokens associated with the user may be refreshed.

Profiles microservice 414 may identify the remaining profile claims associated with both the user and the identified identity provider 412 or access token. Additionally, profiles microservice 414 may track which of the federated microservices 410 gave them which claims. For instance, federated microservice 410 may have, at step 1026, included its identifier in its message sent to composite identity server 408, which may, in turn, have forwarded the federated microservice's 410 identifier to profiles microservice 414 in step 1028. Profiles microservice 414 may include in each record in its database, which is claim-specific, a federated microservice identifier of the federated microservice 410 that sent the claim. Using this information and the information included in the request from composite identity server 408 (e.g., the user identifier, claim identifier, token identifier), profiles microservice 414 may identify the federated microservice 410 that sent the requested profiles claims.

At step 1108, profiles microservice 414 may send the remaining non-expired profile claims associated with the user and the identified identity provider 412 to the identified federated microservice 410, which is associated with the identified identity provider 412. In some cases, profiles microservice 414 may also send the access token (e.g., the one or more claims included in the user's composite token that were also sent by this federated microservice 410). In such cases, the profile claims and the claims of the access token may include all of the claims of the original identity provider token that are not expired.

Federated microservice 410 may process and update the claims (e.g., the profile claims and claims of the access token). As an example, federated microservice 410 may check with the corresponding identity provider 412 that issued the token to verify that each claim is still valid (e.g., that each claim has not expired with respect to identity provider 412). If a claim is expired, federated microservice 410 may receive an updated claim from identity provider 412. For instance, identity provider 412 may issue a new identity provider token or refresh the token and provide the new or refreshed token to federated microservice 410. As another example, a particular claim may be modified based on a new policy.

At step 1110, federated microservice 410 may send, to profiles microservice 414, the updated token, which may include one or more updated claims and/or one or more non-updated claims. At step 1112, profiles microservice 414 may store the updated claims/token in its database. In instances where only the profile claims were sent to federated microservice 410, the claims received from federated microservice 410, which may have been updated, may be merged with the access token and sent to composite identity server 408 at step 1114. In some instances, only the claims of the access token and the profile claims requested for on demand retrieval may be sent to composite identity server 408.

In response to receiving the merged claims, composite identity server 408 may, at step 1116, send, to principals microservice 416, a request for the user's standard claims (e.g., the user's base token A associated with first relying party 406A and issued by first identity provider 412A). In some instances, the request may identify the user via the user identifier and the request may be in the form of a GET command In response, principals microservice 416 may, at step 1118, send a response to composite identity server 408. The response may include the user's standard claims, which may have been updated by principals microservice 416.

At step 1120, composite identity server 408 may merge claims received from the principals microservice 416 with claims received in step 1114 from profiles microservice 414 and send the merged claims to requesting relying party 406.

As an example, the user's standard claims of token A may be merged with the user's updated identity provider token B to form an updated composite token AB. As a result, the composite token AB may now include all claims of the identity provider token B of second identity provider 412B. Additionally, composite identity server 408 may track claims of other identity providers 412 that were previously included in the composite token and may include those claims in the user's updated composite token as well. For instance, composite identity server 408 may, after step 1102, store a copy of the claims of other identity providers 412 that are part of the user's composite token so that the composite identity server 408 may include those claims when the composite identity server 408 performs the merging of the claims to form the updated composite token. Using the merged claims (e.g., the updated composite token), relying party 406 may now be sufficient to permit access to the particular service of the relying party 406 (e.g., second relying party 406B) in the virtual, cloud-based environment.

The process of FIG. 11 may be repeated for claims from a different identity provider 412 and, thus, FIG. 11 also illustrates that claims of the composite token from different identity providers 412 may be separately maintained by the different corresponding federated microservices 410. Each federated microservice 410 is responsible for keeping claims associated with a particular identity provider 412 up-to-date. Additionally, FIG. 11 also illustrates retrieval or request of the underlying identity provider token using the composite token.

In one or more arrangements, one or more steps of the process depicted in FIG. 11 may be performed to update claims of a composite token, which may be performed on a periodic basis. As an example, composite identity server 408 may assign a composite token a validity lifetime starting at its creation. After the validity lifetime of the composite token has expired, identity provider 408 or relying party 406 may cause the composite token to be updated using the process of FIG. 11. However, in some cases, the updated composite token might not include additional profile claims. Similarly stated, the updated composite token may include the same claims as the original composite token with one or more of those claims being updated and might not include any additional profile claims since the profile claims were not requested.

In one or more additional arrangements, profile claims stored at profiles microservice 414 may be assigned a refresh TTL value, after which the originating federated microservice 410 may be called and given the opportunity to update the profile claims. As an example, a claim associated with an expiring identity provider token may be refreshed by its federated microservice 410 and the database record associated with the claim may be updated to reflect the refreshed identity provider token.

Figure 12:
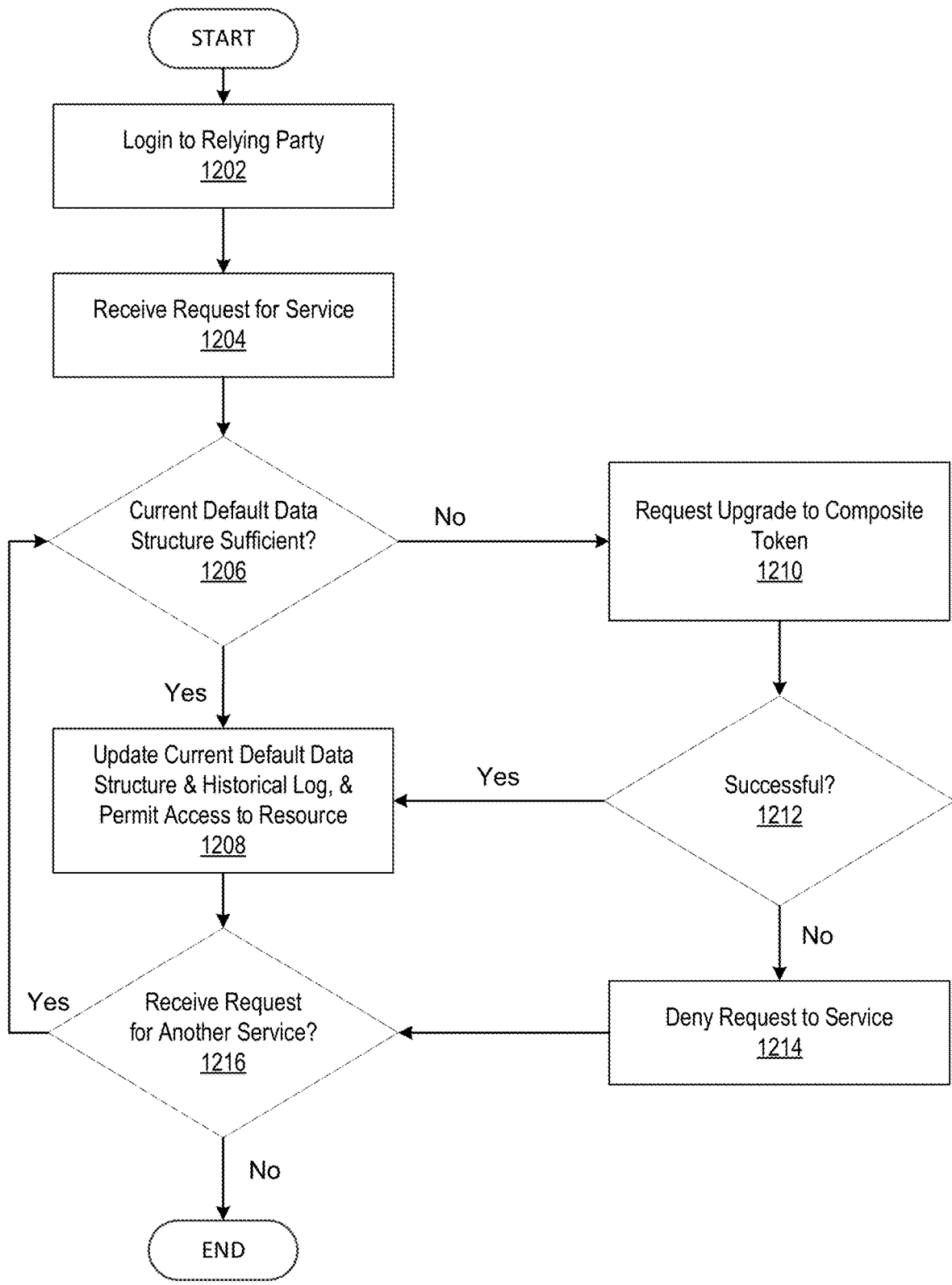
FIG. 12 depicts an illustrative method flow diagram for interacting with multiple services provided by different relying parties, in accordance with one or more illustrative aspects discussed herein.

FIG. 12 depicts an illustrative flow for interacting with multiple services provided by different relying parties 406, in accordance with one or more illustrative aspects discussed herein. The steps of FIG. 12 may be performed by one or more relying parties 406 of the virtual, cloud-based environment.

As shown in FIG. 12, the method may begin at step 1202, in which first relying party 406A may be logged into by user agent 404. As an example, user agent 404 may access a login website of first relying party 406A and provide a username and password to access the user's remote desktop (e.g., the virtual, cloud-based environment). At step 1204, one of the relying parties 406 (e.g., second relying party 406B) may receive, from user agent 404, a request to access a service provided by the relying party 406 in the virtual, cloud-based environment. At step 1206, the relying party 406 (e.g., second relying party 406B) may access the current default data structure (e.g., token A, composite token, etc.) of the user and inspect each of its one or more claims to determine whether one of the claims may permit access to the requested service. If so, user agent 404 may be granted access to the service in step 1208. Step 1208 will be explained in further detail below. Otherwise, if none of the claims of the user's current default data structure are sufficient to permit access to the requested service, then, at step 1210, relying party 406 (e.g., second relying party 406B) may send, to composite identity server 408, a request to upgrade the user's current default data structure. The process of upgrading the user's current default data structure may be the same as process described above in FIGS. 10A-10C. At step 1212, relying party 406 (e.g., relying party 406B) may determine if the upgrade was successful based on whether relying party received a composite token for the user within a maximum preset time period. If not, the upgrade may be considered unsuccessful and, at step 1214, relying party 406 (e.g., relying party 406B) may deny the request for the service and wait for a request for another service at step 1216 until the session is terminated. Otherwise, if relying party 406 receives a composite token for the user within the maximum preset time period, the upgrade may be considered successful and the process may continue to step 1208.

At step 1208, composite identity server 408 may update the user's current default data structure. For instance, the user's composite token may replace the user's current default data structure (e.g., token A or a previous composite token). Additionally, relying party 406 (e.g., second relying party 406B) may permit access to the requested services provided by the relying party 406. Relying party 406 may also update a historical log of frequently used claims stored at composite identity server 408. The process may then continue to step 1216 where the relying parties 406 may wait for a request for another resource. If another request is not received, the process terminates when the user's session ends.

If a request for another service or resource is received from user agent 404, steps 1206-1216 may be repeated. As a result, steps 1206-1216 may be repeated numerous times to account for services provided by different relying parties 406. As a result of upgrading to a composite token, the user only has to authenticate with each identity provider 412 once during a session even if the user alternates between accessing services provided by different relying parties 406, which results in a beneficial single sign-on user experience.

While the above aspects were described with respect virtual memory, similar methodologies may be applied to physical memory. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:
1. A method comprising:
receiving a request to access a resource from a user device, the user device configured to access a session with a first authentication token, and the requested resource being accessible with a second authentication token other than the first authentication token and inaccessible with the first authentication token;

retrieving, based on information in the request, from other than the user device, the second authentication token;

modifying the first authentication token with use of the second authentication token to generate a composite identity token; and transmitting the composite identity token to a server providing the session, wherein the composite identity token permits the user device access to the session and the requested resource.

2. The method of claim 1, wherein the modification of the first authentication token includes transformation of one or more claims of the first authentication token based on the second authentication token.

3. The method of claim 1, wherein the modification of the first authentication token includes addition of a claim indicative of authentication with one or more of a biometric measurement and an access code to the first authentication token.

4. The method of claim 1, further comprising, prior to the transmission of the composite identity token to the server providing the session:

sending an authorization code to the user device; and receiving the authorization code from the server providing the session.

5. The method of claim 1, further comprising:

receiving a subsequent request from the server to update the composite identity token;

updating one or more claims of the composite identity token; and transmitting the updated composite identity token to the server in response to the subsequent request.

6. The method of claim 1, wherein the retrieving of the second authentication token comprises:

redirecting, based on the information in the request, the user device to an identity provider associated with the resource; and receiving, from the identity provider, the second authentication token.

7. The method of claim 6, further comprising, prior to receipt of the second authentication token:

receiving, from the user device, an authorization code; and transmitting, to the identity provider, the authorization code.

8. A computing device comprising:

a memory; and a processor coupled to the memory and configured to:

receive a request to access a resource from a user device, the user device configured to access a session with a first authentication token, and the requested resource being accessible with a second authentication token other than the first authentication token and inaccessible with the first authentication token;

retrieve, based on information in the request, from other than the user device, the second authentication token;

modify the first authentication token with use of the second authentication token to generate a composite identity token; and transmit the composite identity token to a server providing the session, wherein the composite identity token permits the user device access to the session and the requested resource.

9. The computing device of claim 8, wherein the computing device is configured to modify the first authentication token by:

transforming one or more claims of the first authentication token based on the second authentication token.

10. The computing device of claim 8, wherein the computing device is configured to modify the first authentication token by:

adding a claim indicating an authentication using one or more of a biometric measurement and an access code.

11. The computing device of claim 8, wherein the computing device is further configured to, prior to the transmission of the composite identity token to the server providing the session:

send an authorization code to the user device; and receive the authorization code from the server providing the session.

12. The computing device of claim 8, wherein the composite identity token comprises:

one or more transformed claims of the second authentication token; and one or more claims of the first authentication token.

13. The computing device of claim 8, wherein the computing device is further configured to:

receive a subsequent request from the server to update the composite identity token;

update one or more claims of the composite identity token; and transmit the updated composite identity token to the server in response to the subsequent request.

14. The computing device of claim 8, wherein the computing device is configured to retrieve the second authentication by:

redirecting, based on the information in the request, the user device to an identity provider associated with the resource; and receiving, from the identity provider, the second authentication token.

15. The computing device of claim 14, wherein the computing device is further configured to, prior to receipt of the second authentication token:

receive, from the user device, an authorization code; and transmit, to the identity provider, the authorization code.

16. A computing platform comprising:

one or more processors; and memory storing instructions that, when executed by the one or more processors, cause the computing platform to:

receive a request to access a resource from a user device, the user device configured to access a session with a first authentication token, and the requested resource being accessible with a second authentication token other than the first authentication token and inaccessible with the first authentication token;

retrieve, based on information in the request, from other than the user device, the second authentication token for accessing the resource;

generate a composite identity token comprising one or more transformed claims of the second authentication token and one or more claims of the first authentication token; and transmit the composite identity token to a server providing the session, wherein the composite identity token permits the user device access to the session and the requested resource.

17. The computing platform of claim 16, wherein the instructions, when executed by the one or more processors, further cause the computing platform to, as part of generation of the composite identity token:

transform one or more claims of the first authentication token based on the second authentication token.

18. The computing platform of claim 16, wherein the instructions, when executed by the one or more processors, cause the computing platform to, as part of generation of the composite identity token:
   generate a claim indicating an authentication using one or more of a biometric measurement and an access code.

19. The computing platform of claim 16, wherein the instructions, when executed by the one or more processors, cause the computing platform to retrieve the second authentication by:
   redirecting, based on the information in the request, the user device to an identity provider associated with the resource; and
   receiving, from the identity provider, the second authentication token.

20. The computing platform of claim 16, wherein the instructions, when executed by the one or more processors, further cause the computing platform to:
   receive a subsequent request from the server to update the composite identity token;
   update one or more claims of the composite identity token; and
   transmit the updated composite identity token to the server in response to the subsequent request.

\* \* \* \* \*